(12) United States Patent
Steinberg

(10) Patent No.: US 10,447,728 B1
(45) Date of Patent: Oct. 15, 2019

(54) TECHNIQUE FOR PROTECTING GUEST PROCESSES USING A LAYERED VIRTUALIZATION ARCHITECTURE

(71) Applicant: FireEye, Inc., Milpitas, CA (US)

(72) Inventor: Udo Steinberg, Braunschweig (DE)

(73) Assignee: FireEye, Inc., Milpitas, CA (US)

( * ) Notice: Subject to any disclaimer, the term of this patent is extended or adjusted under 35 U.S.C. 154(b) by 314 days.

(21) Appl. No.: 15/230,215

(22) Filed: Aug. 5, 2016

Related U.S. Application Data

(60) Provisional application No. 62/265,751, filed on Dec. 10, 2015.

(51) Int. Cl.
*H04L 29/06* (2006.01)
*H04L 29/08* (2006.01)
(Continued)

(52) U.S. Cl.
CPC ........ *H04L 63/145* (2013.01); *G06F 9/45558* (2013.01); *G06F 16/282* (2019.01);
(Continued)

(58) Field of Classification Search
CPC ................................ H04L 63/20; H04L 67/10
(Continued)

(56) References Cited

U.S. PATENT DOCUMENTS

| | | |
|---|---|---|
| 4,292,580 A | 9/1981 | Ott et al. |
| 5,175,732 A | 12/1992 | Hendel et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Amiri Sani, Ardalan, et al. "I/O paravirtualization at the device file boundary." ACM SIGPLAN Notices 49.4 (2014), pp. 319-332.

(Continued)

*Primary Examiner* — Jason K Gee
*Assistant Examiner* — Dereena T Cattungal
(74) *Attorney, Agent, or Firm* — Rutan & Tucker, LLP

(57) ABSTRACT

A technique protects guest processes of a guest operating system kernel using a virtualization layer of a virtualization architecture executing on a node of a network environment. The virtualization layer may include a user mode portion having hyper-processes and a kernel portion having an micro-hypervisor that cooperate to virtualize the guest operating system kernel within a virtual machine and to make hardware resources of the node available for use by the guest operating system kernel, either as pass-through resources, emulated resources, or a combination thereof. Illustratively, the micro-hypervisor may cooperate with the hyper-processes of the virtualization layer to protect the guest processes against attack by one or more exploits that may employ malware. To that end, the guest process protection technique enables the micro-hypervisor and/or hyper-processes of the virtualization layer to determine (i) when the guest operating system switches to a guest process for execution, (ii) an identity of the guest process, and (iii) a protection policy to be associated with the guest process identity.

32 Claims, 8 Drawing Sheets

(51) Int. Cl.
*G06F 17/27* (2006.01)
*G06F 9/455* (2018.01)
*G06F 16/28* (2019.01)
*G06F 16/901* (2019.01)

(52) U.S. Cl.
CPC ...... *G06F 16/9017* (2019.01); *G06F 17/2705* (2013.01); *H04L 63/10* (2013.01); *H04L 63/1416* (2013.01); *H04L 63/20* (2013.01); *H04L 67/10* (2013.01); *G06F 2009/45583* (2013.01)

(58) Field of Classification Search
USPC .......................................................... 726/1
See application file for complete search history.

(56) References Cited

U.S. PATENT DOCUMENTS

| | | |
|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,104,034 B2 | 1/2012 | Drepper |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,317 B1 | 7/2012 | Chiueh et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |

(56) References Cited

U.S. PATENT DOCUMENTS

| | | |
|---|---|---|
| 8,271,978 B2 | 9/2012 | Bennett et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,387,046 B1 | 2/2013 | Montague |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,286 B2 | 7/2013 | Dalcher et al. |
| 8,479,291 B1 | 7/2013 | Bodke |
| 8,479,292 B1 | 7/2013 | Li et al. |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,236 B2 | 8/2013 | Zimmer et al. |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,656,482 B1 | 2/2014 | Tosa et al. |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,775,715 B2 | 7/2014 | Tsirkin et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,352 B2 | 9/2014 | Tsirkin et al. |
| 8,832,829 B2 | 9/2014 | Manni et al. |
| 8,839,245 B1 | 9/2014 | Khajuria et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,003,402 B1 | 4/2015 | Carbone et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,092,625 B1 | 7/2015 | Kashyap |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,436,619 B2 | 9/2016 | Woolley |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,459,912 B1 | 10/2016 | Durniak et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |

(56) References Cited

U.S. PATENT DOCUMENTS

| | | |
|---|---|---|
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,592 B2 | 12/2017 | Sarangdhar et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0037089 A1 | 2/2003 | Cota-Robles et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0120856 A1 | 6/2003 | Neiger et al. |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0216759 A1 | 9/2005 | Rothman et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |

(56) References Cited

U.S. PATENT DOCUMENTS

| | | |
|---|---|---|
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0130060 A1 | 6/2006 | Anderson et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248528 A1 | 11/2006 | Oney et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006227 A1 | 1/2007 | Kinney et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner |
| 2007/0171824 A1 | 7/2007 | Ruello et al. |
| 2007/0174915 A1 | 7/2007 | Gribble et al. |
| 2007/0180454 A1 | 8/2007 | Fujimoto et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0300227 A1 | 12/2007 | Mall et al. |
| 2008/0005782 A1 | 1/2008 | Aziz |
| 2008/0018122 A1 | 1/2008 | Zierler et al. |
| 2008/0028124 A1 | 1/2008 | Tago |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0065854 A1 | 3/2008 | Schoenberg et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0244206 A1 | 10/2008 | Heo et al. |
| 2008/0263665 A1 | 10/2008 | Ma et al. |
| 2008/0294808 A1 | 11/2008 | Mahalingam et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013149 A1 | 1/2009 | Uhlig et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0106754 A1 | 4/2009 | Liu et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144510 A1 | 6/2009 | Wibling et al. |
| 2009/0144823 A1 | 6/2009 | Lamastra et al. |
| 2009/0158430 A1 | 6/2009 | Borders |
| 2009/0172661 A1 | 7/2009 | Zimmer et al. |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0023810 A1 | 1/2010 | Stolfo et al. |
| 2010/0030996 A1 | 2/2010 | Butler, II |
| 2010/0031353 A1 | 2/2010 | Thomas et al. |
| 2010/0031360 A1 | 2/2010 | Seshadri |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |

(56) References Cited

U.S. PATENT DOCUMENTS

| | | |
|---|---|---|
| 2010/0251104 A1 | 9/2010 | Massand |
| 2010/0254622 A1 | 10/2010 | Kamay et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299665 A1 | 11/2010 | Adams |
| 2010/0299754 A1 | 11/2010 | Amit et al. |
| 2010/0306173 A1 | 12/2010 | Frank |
| 2011/0004737 A1 | 1/2011 | Greenebaum |
| 2011/0004935 A1 | 1/2011 | Moffie et al. |
| 2011/0025504 A1 | 2/2011 | Lyon et al. |
| 2011/0041179 A1 | 2/2011 | St Hlberg |
| 2011/0047542 A1 | 2/2011 | Dang et al. |
| 2011/0047544 A1 | 2/2011 | Yehuda et al. |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0153909 A1 | 6/2011 | Dong |
| 2011/0167422 A1 | 7/2011 | Eom et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0296412 A1 | 12/2011 | Banga et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0320556 A1 | 12/2011 | Reuther |
| 2012/0023593 A1 | 1/2012 | Puder et al. |
| 2012/0047580 A1 | 2/2012 | Smith et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084517 A1 | 4/2012 | Post et al. |
| 2012/0084859 A1 | 4/2012 | Radinsky et al. |
| 2012/0093160 A1 | 4/2012 | Tonsing et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0254995 A1 | 10/2012 | Sallam |
| 2012/0255002 A1 | 10/2012 | Sallam |
| 2012/0255015 A1 | 10/2012 | Sahita et al. |
| 2012/0255016 A1 | 10/2012 | Sallam |
| 2012/0255017 A1 | 10/2012 | Sallam |
| 2012/0255021 A1 | 10/2012 | Sallam |
| 2012/0260342 A1 | 10/2012 | Dube et al. |
| 2012/0266244 A1 | 10/2012 | Green et al. |
| 2012/0272241 A1 | 10/2012 | Nonaka et al. |
| 2012/0278886 A1 | 11/2012 | Luna |
| 2012/0297489 A1 | 11/2012 | Dequevy |
| 2012/0311708 A1 | 12/2012 | Agarwal et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0031374 A1 | 1/2013 | Thom et al. |
| 2013/0036472 A1 | 2/2013 | Aziz |
| 2013/0047257 A1 | 2/2013 | Aziz |
| 2013/0055256 A1 | 2/2013 | Banga et al. |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0125115 A1 | 5/2013 | Tsirkin et al. |
| 2013/0139264 A1 | 5/2013 | Brinkley et al. |
| 2013/0145055 A1 | 6/2013 | Kegel et al. |
| 2013/0145471 A1 | 6/2013 | Richard et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0191924 A1 | 6/2013 | Tedesco et al. |
| 2013/0174147 A1 | 7/2013 | Sahita |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191824 A1* | 7/2013 | Muff .................. G06F 9/45558 718/1 |
| 2013/0191915 A1 | 7/2013 | Antonakakis et al. |
| 2013/0196649 A1 | 8/2013 | Paddon et al. |
| 2013/0227680 A1 | 8/2013 | Pavlyushchik |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0282776 A1 | 10/2013 | Durrant et al. |
| 2013/0283370 A1* | 10/2013 | Vipat .................. G06F 21/44 726/17 |
| 2013/0291109 A1 | 10/2013 | Staniford et al. |
| 2013/0298243 A1 | 11/2013 | Kumar et al. |
| 2013/0305006 A1 | 11/2013 | Altman et al. |
| 2013/0312099 A1 | 11/2013 | Edwards |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0332926 A1 | 12/2013 | Jakoljevic et al. |
| 2013/0333033 A1 | 12/2013 | Khesin |
| 2013/0346966 A1 | 12/2013 | Natu et al. |
| 2013/0347131 A1 | 12/2013 | Mooring et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0115652 A1 | 4/2014 | Kapoor |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0281560 A1 | 9/2014 | Ignatchenko et al. |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351810 A1 | 11/2014 | Pratt |

(56) References Cited

U.S. PATENT DOCUMENTS

| | | | |
|---|---|---|---|
| 2014/0351935 A1 | 11/2014 | Shao et al. | |
| 2014/0380009 A1* | 12/2014 | Lemay | G06F 12/145 711/163 |
| 2014/0380308 A1 | 12/2014 | Hassine et al. | |
| 2014/0380473 A1 | 12/2014 | Bu et al. | |
| 2014/0380474 A1 | 12/2014 | Paithane et al. | |
| 2015/0007312 A1 | 1/2015 | Pidathala et al. | |
| 2015/0085665 A1 | 3/2015 | Kompella et al. | |
| 2015/0096022 A1 | 4/2015 | Vincent et al. | |
| 2015/0096023 A1 | 4/2015 | Mesdaq et al. | |
| 2015/0096024 A1 | 4/2015 | Haq et al. | |
| 2015/0096025 A1 | 4/2015 | Ismael | |
| 2015/0180886 A1 | 6/2015 | Staniford et al. | |
| 2015/0186645 A1 | 7/2015 | Aziz et al. | |
| 2015/0199513 A1 | 7/2015 | Ismael et al. | |
| 2015/0199514 A1 | 7/2015 | Tosa | |
| 2015/0199531 A1 | 7/2015 | Ismael et al. | |
| 2015/0199532 A1 | 7/2015 | Ismael | |
| 2015/0220735 A1 | 8/2015 | Paithane et al. | |
| 2015/0242227 A1* | 8/2015 | Nair | G06F 21/60 718/1 |
| 2015/0269004 A1* | 9/2015 | Gainey, Jr. | G06F 9/45533 714/53 |
| 2015/0355919 A1 | 12/2015 | Gatherer et al. | |
| 2015/0372980 A1 | 12/2015 | Eyada | |
| 2016/0004869 A1 | 1/2016 | Ismael et al. | |
| 2016/0006756 A1 | 1/2016 | Ismael et al. | |
| 2016/0044000 A1 | 2/2016 | Cunningham | |
| 2016/0048464 A1 | 2/2016 | Nakajima et al. | |
| 2016/0055017 A1 | 2/2016 | Beveridge et al. | |
| 2016/0110291 A1 | 4/2016 | Gordon et al. | |
| 2016/0127393 A1 | 5/2016 | Aziz et al. | |
| 2016/0132351 A1 | 5/2016 | Kashyap et al. | |
| 2016/0147993 A1* | 5/2016 | Xu | G06F 21/53 726/22 |
| 2016/0191547 A1 | 6/2016 | Zafar et al. | |
| 2016/0191550 A1 | 6/2016 | Ismael et al. | |
| 2016/0246730 A1 | 8/2016 | Gandhi et al. | |
| 2016/0261612 A1 | 9/2016 | Mesdaq et al. | |
| 2016/0285914 A1 | 9/2016 | Singh et al. | |
| 2016/0299851 A1* | 10/2016 | Mattson, Jr. | G06F 9/45558 |
| 2016/0301703 A1 | 10/2016 | Aziz | |
| 2016/0306749 A1 | 10/2016 | Tsirkin | |
| 2016/0335110 A1 | 11/2016 | Paithane et al. | |
| 2017/0083703 A1 | 3/2017 | Abbasi et al. | |
| 2017/0262306 A1 | 9/2017 | Wang et al. | |
| 2018/0013770 A1 | 1/2018 | Ismael | |
| 2018/0048660 A1 | 2/2018 | Paithane et al. | |
| 2018/0121316 A1 | 5/2018 | Ismael et al. | |
| 2018/0288077 A1 | 10/2018 | Siddiqui et al. | |

FOREIGN PATENT DOCUMENTS

| | | | |
|---|---|---|---|
| WO | 02/006928 | A2 | 1/2002 |
| WO | 02/23805 | A2 | 3/2002 |
| WO | 2007117636 | A2 | 10/2007 |
| WO | 2008/041950 | A2 | 4/2008 |
| WO | 2011/084431 | A2 | 7/2011 |
| WO | 2011/112348 | A1 | 9/2011 |
| WO | 2012/075336 | A1 | 6/2012 |
| WO | 2012/135192 | A2 | 10/2012 |
| WO | 2012/145066 | A1 | 10/2012 |
| WO | WO2012/135192 | | 10/2012 |
| WO | 2012/154664 | A2 | 11/2012 |
| WO | WO2012/154664 | | 11/2012 |
| WO | 2012/177464 | A1 | 12/2012 |
| WO | WO-2012/177464 | A1 | 12/2012 |
| WO | 2013/067505 | A1 | 5/2013 |
| WO | 2013091221 | A1 | 6/2013 |
| WO | WO-2013/091221 | A1 | 6/2013 |
| WO | 2014/004747 | A2 | 1/2014 |
| WO | WO-2014/004747 | A2 | 1/2014 |

OTHER PUBLICATIONS

"Bromium vSentry—Defeat the Unknown Attack," Oct. 10, 2013, 11 pages.
Bromium Corp, "Bromium vSentry, Defeat of the Unknown Attack," downloaded from http://www.bromium.com/sites/default/files/Bromium-Whitepaper-vSentry_2.pdf on Dec. 1, 2013.
Bromium Corp, "Live Attack Visualization and Analysis, What does a Malware attack look like?" http://www.bromium.com/sites/default/files/Bromium%20LAVA%20WP_2.pdf on Dec. 1, 2013.
Chen, Peter M., and Brian D. Noble. "When virtual is better than real [operating system relocation to virtual machines]." Hot Topics in Operating Systems, 2001. Proceedings of the Eighth Workshop on. IEEE, 2001.
Gao, Debin, Michael K. Reiter, and Dawn Xiaodong Song. "On Gray-Box Program Tracking for Anomaly Detection." USENIX security symposium. 2004.
Garfinkel, Tal, and Mendel Rosenblum. "A Virtual Machine Introspection Based Architecture for Intrusion Detection." NDSS. 2003.
Gerzon, Gideon—"Intel® Virtualization Technology Processor Virtualization Extensions and Intel® Trusted execution Technology." (2007), 53 pages.
Heiser, Gernot, and Ben Leslie. "The OKL4 Microvisor: Convergence point of microkernels and hypervisors." Proceedings of the first ACM asia-pacific workshop on Workshop on systems. ACM, 2010.
Hofmeyr, Steven A., Stephanie Forrest, and Anil Somayaji. "Intrusion detection using sequences of system calls." Journal of computer security 6.3 (1998): 151-180.
Huang, Yih, et al. "Efficiently tracking application interactions using lightweight virtualization." Proceedings of the 1st ACM workshop on Virtual machine security. ACM, 2008.
Intel—"Intel 64 and IA-32 Architectures Software Developer's Manual, vol. 3B: System Programming Guide." Part 2, 2011, (Section 2.83, pp. 51-59), 1026 pages.
Iqbal, Asif, Nayeema Sadeque, and Rafika Ida Mutia. "An overview of microkernel, hypervisor and microvisor virtualization approaches for embedded systems." Report, Department of Electrical and Information Technology, Lund University, Sweden 2110 (2009), 15 Pages.
Iqbal, et al.,—"An Overview of Microkernel, Hypervisor and Microvisor Virtualization Approaches for Embedded Systems," Department of Electrical and Information Technology, Lund University, Sweden, Aug. 26, 2013, 15 pages.
Jiang, Xuxian, Xinyuan Wang, and Dongyan Xu. "Stealthy malware detection through vmm-based out-of-the-box semantic view reconstruction." Proceedings of the 14th ACM conference on Computer and communications security. ACM, 2007.
Jones, Stephen T., Andrea C. Arpaci-Dusseau, and Remzi H. Arpaci-Dusseau. "Antfarm: Tracking Processes in a Virtual Machine Environment." USENIX Annual Technical Conference, General Track. 2006.
Kapravelos, Alexandros, et al. "Revolver: An Automated Approach to the Detection of Evasive Web-based Malware." USENIX Security Symposium. 2013.
King, Samuel T., and Peter M. Chen. "SubVirt: Implementing malware with virtual machines." Security and Privacy, 2006 IEEE Symposium on. IEEE, 2006, 14 Pages.
Kivity et al. "kvm: the Linux virtual machine monitor." Proceedings of the Linux symposium. vol. 1. 2007, 8 pages.
Kosoresow, Andrew P., and Steven A. Hofmeyr. "Intrusion detection via system call traces." IEEE software 14.5 (1997): 35-42.
Laureano, Marcos, Carlos Maziero, and Edgard Jamhour. "Intrusion detection in virtual machine environments." Euromicro Conference, 2004. Proceedings. 30th. IEEE, 2004.
Levin, Thomas E., Cynthia E. Irvine, and Thuy D. Nguyen. Least privilege in separation kernels. Naval Postgraduate School Monterey CA Dept of Computer Science, 2006.
Nguyen, Anh M., et al. "Mavmm: Lightweight and purpose built vmm for malware analysis." Computer Security Applications Conference, 2009. ACSAC'09. Annual. IEEE, 2009.
PCT Notification of Transmittal of the International Search Report and the Written Opinion of the International Searching Authority, or

(56) References Cited

OTHER PUBLICATIONS the Declaration, International Searching Authority, International Application No. PCT/US2014/071847, dated Mar. 26, 2015, 16 pages.
PCT Notification of Transmittal of the International Search Report and the Written Opinion of the International Searching Authority, or the Declaration, International Searching Authority, International Application No. PCT/US2014/071879, dated Apr. 28, 2015, 12 pages.
PCT Notification of Transmittal of the International Search Report and the Written Opinion of the International Searching Authority, or the Declaration, International Searching Authority, International Application No. PCT/US2014/071923, dated Mar. 26, 2015, 13 pages.
Shah et al "Hardware-assisted Virtualization," 15-612 Operating System Practicum Carnegie Mellon University, Sep. 8, 2013, 28 pages.
Steinberg, Udo, and Bernhard Kauer. "NOVA: a microhypervisor-based secure virtualization architecture." Proceedings of the 5th European conference on Computer systems. ACM, 2010, 14 Pages.
Stumpf, Frederic, et al. "An approach to a trustworthy system architecture using virtualization." Autonomic and trusted computing. Springer Berlin Heidelberg, 2007. 191-202.
Sun, Kun, et al. "SecureSwitch: BIOS-Assisted Isolation and Switch between Trusted and Untrusted Commodity OSes." George Mason Feb. 26, 2013, 15 pages.
Wafaa, Andrew—"Introducing the 64-bit ARMv8 Architecture" Open Source Arm Ltd. EuroBSDCon conference, Malta, Sep. 28-29, 2013, 20 pages.
Wojtczuk, Rafal. "Subverting the Xen hypervisor." Black Hat USA 2008 (2008), pages.
Yan, Lok Kwong, et al. "Transparent and Extensible Malware Analysis by Combining Hardware Virtualization and Software Emulation." Internet Society, 2010. Downloaded from https://www.internetsociety.org/sites/defaut/files/05_1.pdf, 1 page.
U.S. Appl. No. 15/229,770, filed Aug. 5, 2016 Non-Final Office Action dated Nov. 2, 2017.
U.S. Appl. No. 15/229,770, filed Aug. 5, 2016 Notice of Allowance dated May 18, 2018.
U.S. Appl. No. 15/237,377, filed Aug. 15, 2016 Advisory Action dated Oct. 19, 2018.
U.S. Appl. No. 15/237,377, filed Aug. 15, 2016 Final Rejection dated Jul. 10, 2018.
U.S. Appl. No. 15/237,377, filed Aug. 15, 2016 Non-Final Rejection dated Feb. 6, 2019.
U.S. Appl. No. 15/237,377, filed Aug. 15, 2016 Non-Final Rejection dated Jan. 18, 2018.
U.S. Appl. No. 15/257,704, filed Sep. 6, 2016 Non-Final Office Action dated Mar. 12, 2018.
U.S. Appl. No. 15/257,704, filed Sep. 6, 2016 Notice of Allowance dated Sep. 19, 2018.
U.S. Appl. No. 15/199,871, filed Jun. 30, 2016.
U.S. Appl. No. 15/199,873, filed Jun. 30, 2016.
U.S. Appl. No. 15/199,876, filed Jun. 30, 2016.
U.S. Appl. No. 15/199,882, filed Jun. 30, 2016.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.sp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the

(56) References Cited

OTHER PUBLICATIONS

Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).

\* cited by examiner

TECHNIQUE FOR PROTECTING GUEST PROCESSES USING A LAYERED VIRTUALIZATION ARCHITECTURE

RELATED APPLICATION

The present application claims priority from commonly owned Provisional Patent Application No. 62/265,751, entitled TECHNIQUE FOR PROTECTING GUEST PROCESSES USING A LAYERED VIRTUALIZATION ARCHITECTURE, filed on Dec. 10, 2015, the contents of which are incorporated herein by reference.

BACKGROUND

Technical Field

The present disclosure relates to virtualization architectures and, more specifically, to protection of guest processes using a virtualization layer of a virtualization architecture.

Background Information

Data communication in a network involves the exchange of data between two or more entities interconnected by communication links and sub-networks (segments). The entities are typically software processes executing in operating systems of computers, such as endpoint nodes (endpoints) and intermediate nodes. The intermediate nodes interconnect the communication links and segments to enable transmission of data between the endpoints. A local area network (LAN) is an example of segment that provides relatively short distance communication among the interconnected nodes, whereas a wide area network (WAN) enables long distance communication over links provided by telecommunications facilities. The Internet is an example of a WAN that connects disparate computer networks throughout the world, providing global communication between nodes on various networks.

Malicious software (malware) has become a pervasive problem for nodes coupled to networks, such as the Internet. Malware is often embedded within downloadable content intended to adversely influence or attack normal operations of a node. Whereas operating system vulnerabilities have traditionally been common targets of such malware content, attackers have broadened their attack to exploit vulnerabilities in processes or applications, such as web browsers as well as operating system data structures. For example, malware content may be embedded within objects associated with a web page hosted by a malicious web site.

Various types of security enhanced nodes are often deployed at different segments of the networks. These nodes often employ virtualization systems to provide enhanced security needed to uncover the presence of malware embedded within ingress content propagating over the different segments. The enhanced security may include anti-virus scanning software that scans the ingress content for viruses and other forms of malware, as well as virtual machines that replay the content to monitor its behavior during execution so as to detect anomalies that may indicate the presence of malware. However, increasingly sophisticated malware may be able to infect the virtual machines to avoid detection by, e.g., altering states of resources of the nodes, such as operating system data structures. Moreover, strict specifications for some nodes (e.g., endpoints) may require execution of software, despite known vulnerabilities and potential of infection by malware. Thus, a technique to protect the processes executing (as well as operating system data structures) in the virtual machines of the nodes is needed.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
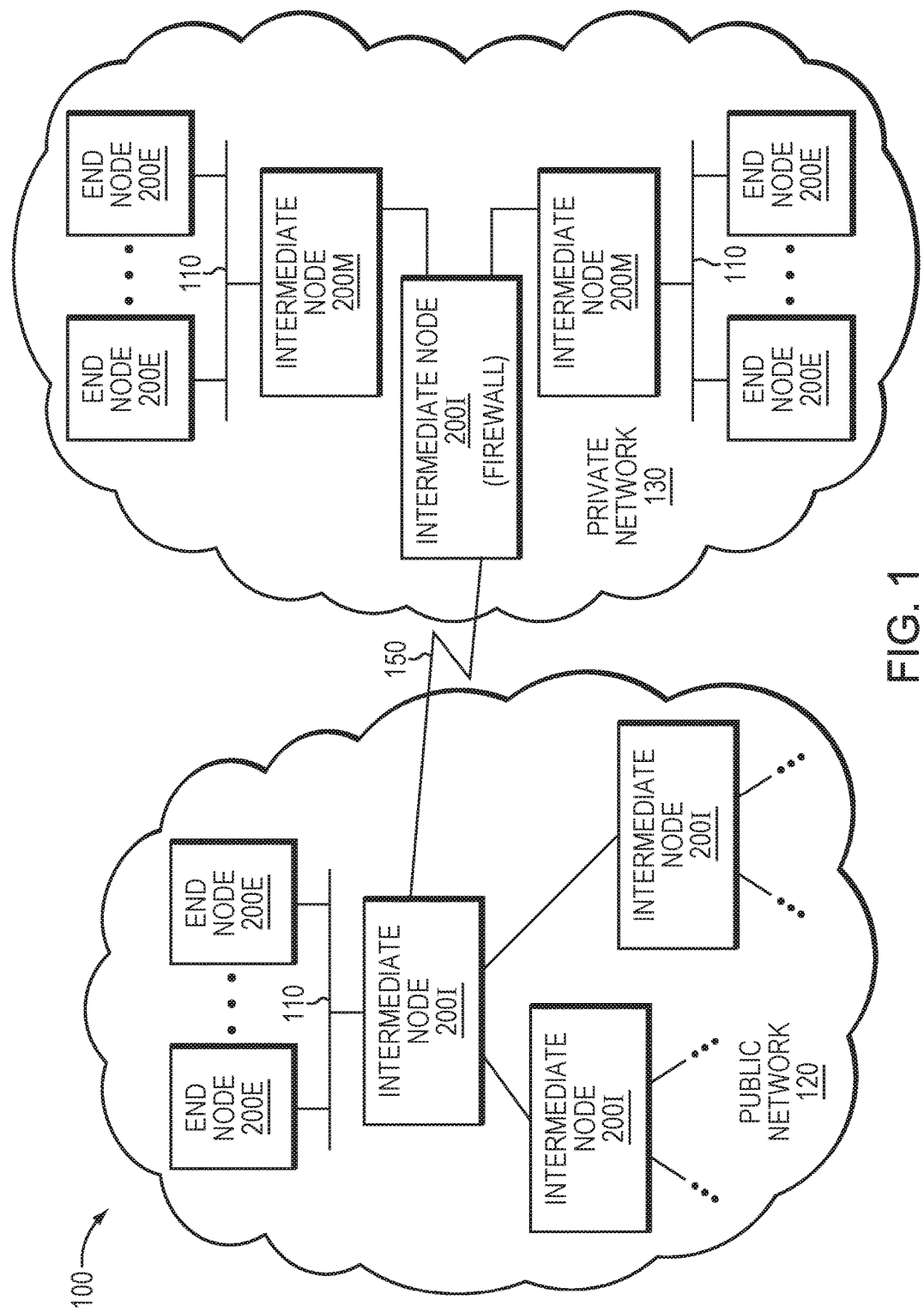
FIG. 1 is a block diagram of a network environment that may be advantageously used with one or more embodiments described herein.

The embodiments described herein provide a technique for protecting guest processes of a guest operating system kernel using a virtualization layer of a virtualization architecture executing on a node of a network environment. The virtualization layer may include a user mode portion having hyper-processes and a kernel portion having a micro-hypervisor (i.e., a type of hypervisor operating at a highest privilege level of a physical processor of the node) that cooperate to virtualize the guest operating system kernel within a virtual machine and to make hardware resources of the node available for use by the guest operating system kernel, either as pass-through resources, emulated resources, or a combination thereof. Illustratively, the micro-hypervisor may cooperate with the hyper-processes of the virtualization layer to protect the guest processes against attack by one or more exploits that may employ malware. To that end, the guest process protection technique enables the micro-hypervisor and/or hyper-processes of the virtualization layer to determine (i) when the guest operating system switches to a guest process for execution, (ii) an identity of the guest process, and (iii) a protection policy to be associated with the guest process identity.

In an embodiment, each guest process runs in its own guest address space and has one or more guest page tables in the form of a guest page table hierarchy associated with that address space. The guest operating system kernel employs the guest page table hierarchy to perform a first address space translation from a guest-virtual address to a guest-physical address. The virtualization layer performs a second address space translation nested (i.e., layered) with the first translation that employs one or more nested page tables in a form of a nested page table hierarchy to, e.g., perform the second translation from the guest-physical address to a host-physical address used to access main memory of the node (i.e., a view of main memory as seen by the virtual machine). The translation of guest-physical address to host-physical address may be flexible, i.e., such translation may be implemented on a per page basis to determine how each guest-physical address is translated to a host-physical address.

A root address for each page table hierarchy is stored in a control register of a central processing unit (CPU) of the node. As a hardware resource, the control register is virtualized by the virtualization layer as a virtual control register for use by the guest operating system kernel. When switching guest processes (and address spaces) for execution on the CPU during a context switch, the guest operating system kernel swaps a prior guest page table hierarchy (i.e., a prior address space) for the guest page table hierarchy of the guest process (i.e., a current address space) to be executed by loading the root address of the guest page table hierarchy into the virtual control register to activate the guest page table hierarchy (i.e., the current address space). According to the technique, switching among guest processes for execution on the CPU may be determined using the content of the virtual control register, which represents the root address of the guest page table hierarchy. Specifically, the virtualization layer may be configured to intercept write accesses to the virtual control register to determine switching of guest processes. That is, upon detecting a new root address (value) loaded into the virtual control register, the virtualization layer may determine that the guest operating system is switching from a prior guest process associated with the prior guest page table hierarchy to the (current) guest process associated with the guest page table hierarchy.

The virtualization layer may then determine the identity of the guest process associated with the guest page table hierarchy using various approaches. One such approach involves content analysis of the guest process, wherein one or more code pages of the process, as marked by the guest page table hierarchy, are hashed to identify the process. The virtualization layer may perform the content analysis by examining the guest page table hierarchy to select the one or more code pages (e.g., entries in the guest page table hierarchy that are marked executable) of the guest process and hashing those code pages to effectively hash the code section of the process. Accordingly, hashing any instance of the guest process code pages should produce a hash value that is identical to a pre-computed hash value for the process, as each instance of the guest process has an identical code section. As a result, if a hash function having a substantially low collision rate is used to hash the code section of a guest process to produce a hash value that is known (e.g., via a pre-computed hash value for the process), then the identity of the guest process can be determined from the known hash value.

Another approach for determining the identity of the guest process associated with the guest page table hierarchy involves an in-guest component (agent) that cooperates with the virtualization layer to inform about guest process creation and destruction. Illustratively, for each newly created guest process, the agent may inform the virtualization layer of the identity of the new guest process and of the corresponding value of the virtual control register that points to the guest page tables of that guest process. Upon destruction of the (new) guest process, the agent may inform the virtualization layer to no longer track the value of the virtual control register corresponding to the guest process, because that process has been destroyed.

Upon determining the identity of a guest process, the virtualization layer may associate a protection policy, embodied as a protection profile, to the guest process. According to the technique, the protection profile may (i) contain information about process events that may be intercepted by the virtualization layer, wherein the intercepted events may involve certain instructions or accesses, (ii) contain a reference to a nested page table hierarchy associated with the guest process, and (iii) specify restrictions (e.g., embodied as permissions of nested page tables of the nested page table hierarchy) to be applied when the process is active (e.g., run). For example, assume that the guest process may have known vulnerabilities, wherein exploits that target the process may exhibit similar behavior, such as overflowing a buffer on a process stack. As a result, the protection profile applied to the process by the virtualization layer may state that when the process is created or activated, permissions that render the stack non-executable are applied. More generally, the virtualization layer may apply the protection profile to override the permissions configured by the guest operating system kernel in the guest page tables (for the guest-virtual address to guest-physical address translations) with the permissions configured by the virtualization layer in the nested page tables (for the guest-physical address to host-physical address translations) on a per-page and per-process basis.

Advantageously, the guest process protection technique provides protection at the granularity of memory pages (or sub-pages) for a guest process running in a guest operating system. To that end, the virtualization layer (including the micro-hypervisor) may monitor the switching of the guest page table hierarchy in the guest operating system kernel to determine when the guest process executes and then identify the guest process through hashing of its code pages. The virtualization layer may thereafter utilize the nested page table hierarchy to apply protections for the process at the granularity of code pages, as opposed to protecting a general address space of the entire guest operating system kernel. In other words, the technique enables identification of a particular guest process and application of a protection profile to that process alone.

DESCRIPTION

FIG. 1 is a block diagram of a network environment 100 that may be advantageously used with one or more embodiments described herein. The network environment 100 illustratively includes a plurality of computer networks organized as a public network 120, such as the Internet, and a private network 130, such an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_I$ to form an internetwork of nodes, wherein the intermediate nodes $200_I$ may include network switches, routers and/or one or more malware detection system (MDS) appliances (intermediate node $200_M$). As used herein, an appliance may be embodied as any type of general-purpose or special-purpose computer, including a dedicated computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes $200_E$ which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., network traffic) according to a predefined set of protocols, such as the Transmission Control Protocol/Internet Protocol (TCP/IP); however, it should be noted that additional protocols, such as the HyperText Transfer Protocol Secure (HTTPS), may be advantageously used with the embodiments herein. In the case of private network 130, the intermediate node $200_I$ may include a firewall or other network device configured to limit or block certain network traffic in an attempt to protect the endpoints from unauthorized users. Unfortunately, such conventional attempts often fail to protect the endpoints, which may be compromised.

Figure 2:
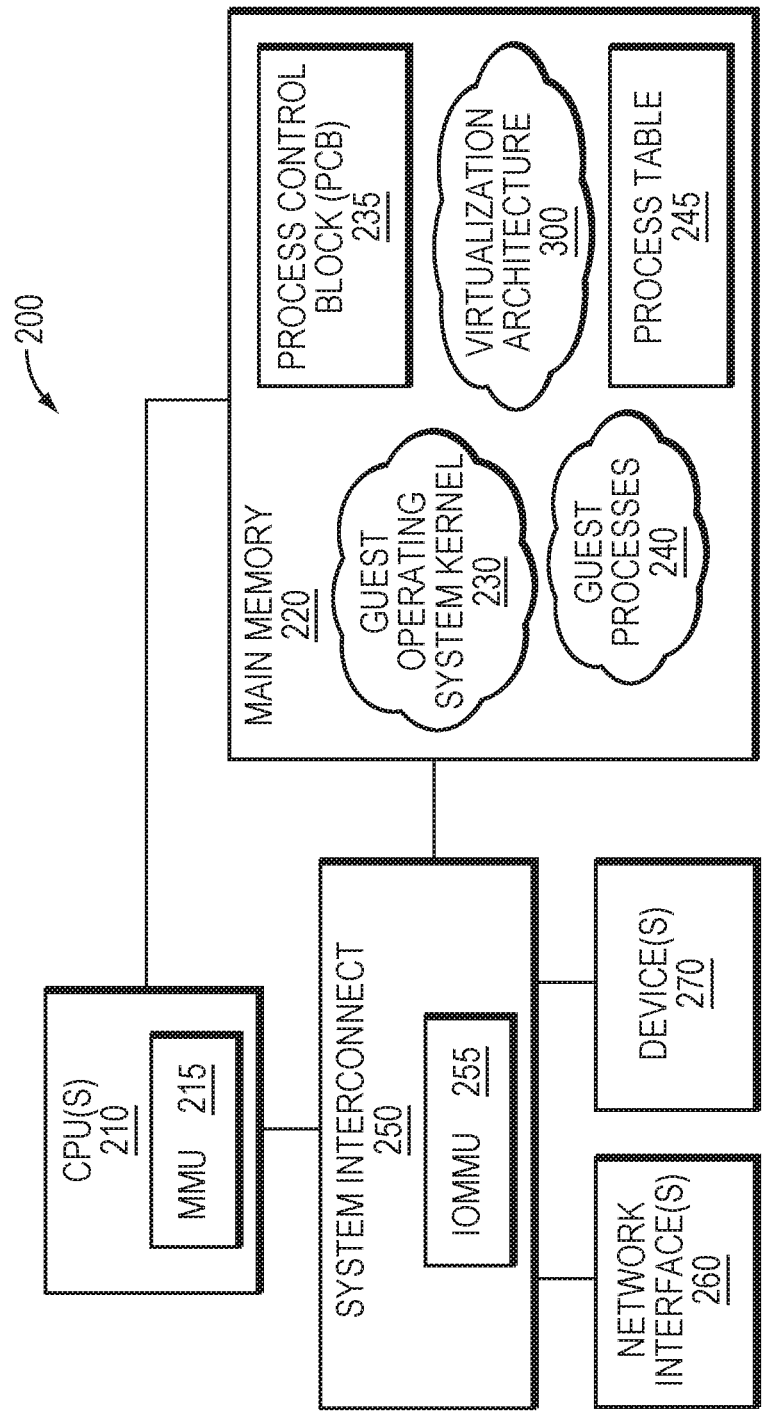
FIG. 2 is a block diagram of a node that may be advantageously used with one or more embodiments described herein.

FIG. 2 is a block diagram of a node 200, e.g., end node $200_E$ or MDS appliance $200_M$, that may be advantageously used with one or more embodiments described herein. The node 200 illustratively includes one or more central processing unit (CPUs) 210 each having one or more CPU cores (not shown), a main memory 220, one or more network interfaces 260 and one or more devices 270 connected by a system interconnect 250. The devices 270 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 260 may include one or more network ports containing the mechanical, electrical and/or signaling circuitry needed to connect the node to the network 130 to thereby facilitate communication over the network. To that end, the network interface 260 may be configured to transmit and/or receive messages using a variety of communication protocols including, inter alia, TCP/IP and HTTPS.

The memory 220 may include a plurality of locations that are addressable by the CPU(s) 210 via a memory management unit (MMU 215), as well as the network interface(s) 260 and device(s) 270 via an I/O MMU (IOMMU 255). Note that accesses to/from memory 220 by the CPU(s) 210 may occur directly through the MMU 215 and over the system interconnect 250, whereas accesses to/from the memory by the network interface(s) 260 and device(s) 270 may occur directly through the IOMMU 255 of the system interconnect. That is, a first data path may occur directly from the CPU to the memory 220 via the system interconnect 250 and a second (independent) data path may occur directly from the I/O devices 270 to the memory 220 also via the system interconnect 270. The memory locations may be configured to store software program code (including application programs) and data structures associated with the embodiments described herein. The CPU 210 may include processing elements or logic adapted to execute the software program code, such as modules of a virtualization architecture 300, and manipulate the data structures, such as a process control block (PCB) 235 and a process table 245. Exemplary CPUs may include families of instruction set architectures based on the x86 CPU from Intel Corporation of Santa Clara, Calif., the x64 CPU from Advanced Micro Devices of Sunnyvale, Calif., and the ARM CPU from ARM Holdings, plc of the United Kingdom.

A (guest) operating system kernel 230, portions of which are typically resident in memory 220 and executed by the CPU, functionally organizes the node by, inter alia, invoking operations in support of the software program code and application programs executing on the node. A suitable guest operating system kernel 230 may include the Windows® series of operating systems from Microsoft Corp of Redmond, Wash., the MAC OS® and IOS® series of operating systems from Apple Inc. of Cupertino, Calif., the Linux operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the software program code may be executed as guest processes 240 of the kernel 230. As used herein, a process (e.g., a guest process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer applications or programs stored in memory, alternative embodiments may also include the code, processes and programs being embodied as components, logic, and/or modules consisting of hardware, software, firmware, or combinations thereof.

Virtualization Architecture

Figure 3:
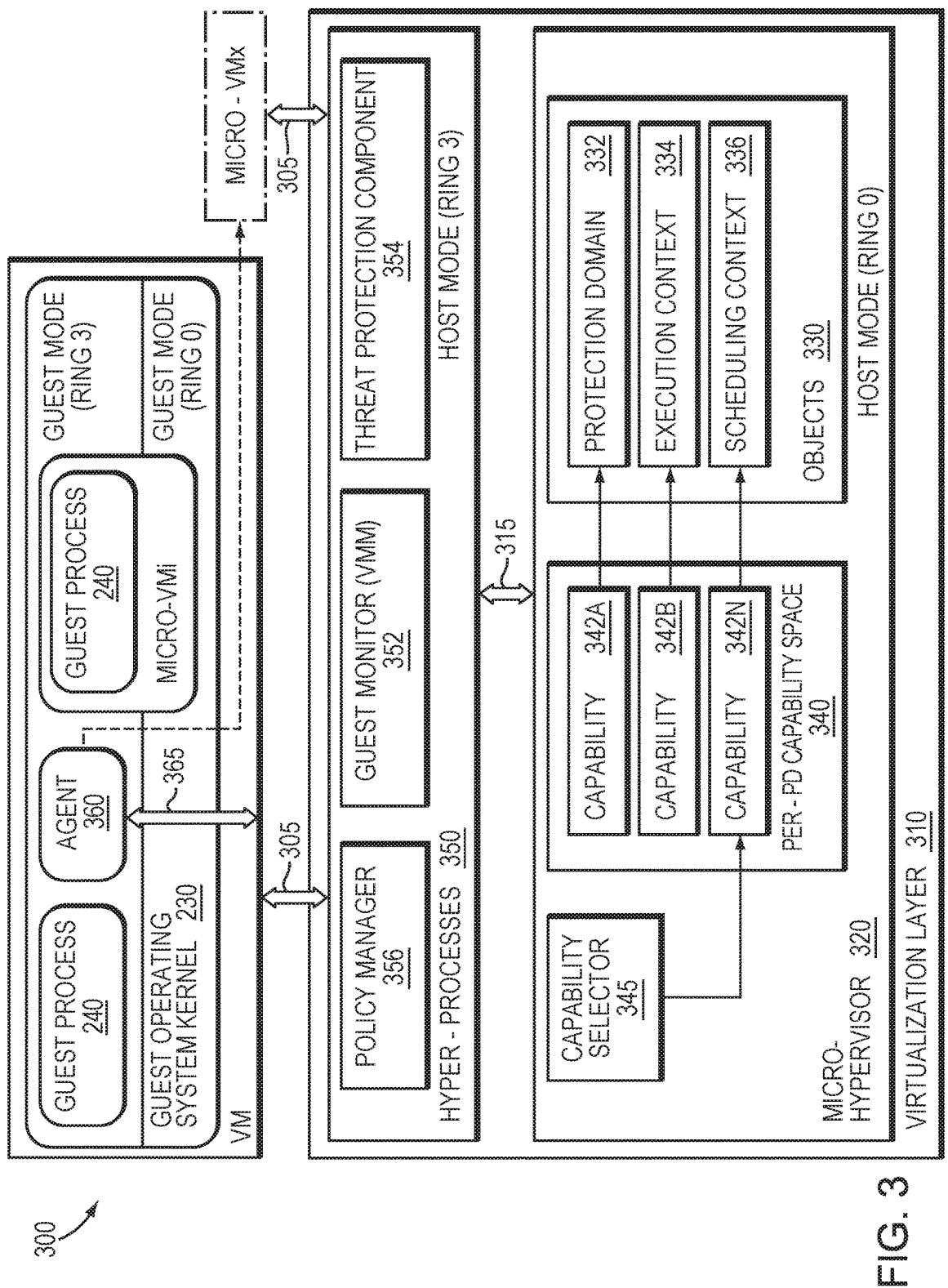
FIG. 3 is a block diagram of a virtualization architecture including a virtualization layer that may be advantageously used with one or more embodiments described herein.

FIG. 3 is a block diagram of a virtualization architecture 300 including a virtualization layer 310 that may be advantageously used with one or more embodiments described herein. The virtualization architecture 300 described herein is illustratively deployed in node 200 embodied as endpoint $200_E$ although the architecture may be further extended for deployment in an appliance, such as MDS appliance $200_M$. The virtualization architecture 300 illustratively includes two privilege modes: guest mode and host mode. In an embodiment, a guest operating system (O/S) runs in the guest mode within a virtual machine, e.g., VM. The guest mode may employ a first set of four protection rings, e.g., guest mode rings 0-3, wherein one or more guest applications (guest processes 240) run in guest mode ring 3 at a lowest guest mode privilege level, and the guest operating system (guest operating system kernel 230) runs in guest mode ring 0 at a highest guest mode privilege level. The virtualization layer 310 operates in host mode of the virtualization architecture, which includes a second set of four protection rings, e.g., host mode rings 0-3. Illustratively, various user mode components embodied as hyper-processes 350 of the virtualization layer 310 run in host mode ring 3 at a lowest host mode privilege level, and a kernel portion (i.e., micro-hypervisor 320) of the virtualization layer runs in host mode ring 0 at a highest host mode privilege level.

The micro-hypervisor 320 (i.e., a type of hypervisor operating at a highest privilege level of a physical processor of the node) may be embodied as a light-weight module configured to facilitate run-time security analysis, including exploit and malware detection and threat intelligence, of the guest processes 240 executing on the node 200. As described herein, the micro-hypervisor 320 may cooperate with corresponding hyper-processes 350 of the virtualization layer 310 to virtualize the hardware and control privileges (i.e., access control permissions) to hardware resources of the node that are typically controlled by the guest operating system kernel. Illustratively, the hardware resources may include (physical) CPU(s) 210, memory 220, network interface(s) 260, and devices 270. The micro-hypervisor 320 may be configured to control access to one or more of the resources in response to a request by a guest process 240 to access the resource.

A user mode portion of the virtualization layer 310 includes the hyper-processes 350, examples of which include, inter alia, a guest monitor 352, a threat protection component 354, and a policy manager 356. The guest monitor 352 is illustratively a unique virtual machine monitor (VMM), i.e., a type 0 VMM, which includes virtualization functionality that cooperates with the micro-hypervisor 320 to virtualize the guest operating system within the VM and run one or more micro-virtual machines (micro-VMs), such as, in some embodiments, a memory view (as described below). Accordingly, the guest monitor 352 may include computer executable instructions executed by the CPU 210 to perform operations that spawn, configure, and control/implement the VM or any of a plurality of micro-VMs. The guest monitor 352 may further include virtualization functionality that emulates privileged instructions (i.e., an instruction emulator) and devices (i.e., a virtual device emulator) that act as software substitutes for hardware devices not directly assigned to the guest operating system. As such, a set of hardware resources may be virtualized among a plurality of micro-VMs that may access those resources. That is, the guest monitor 352 may create virtual devices (e.g., software state machines) of the hardware resources for use by the micro-VMs that, from the perspective of the guest operating system, appear as physical resources.

As used herein, the term "micro" VM denotes a virtual machine serving as a container that may be restricted to a single guest process (as opposed to the VM which is spawned as a container for the entire guest operating system having many guest processes). In one embodiment, the micro-VMx may be implemented outside of the VM, (i.e., in a separate protection domain) using, e.g., copy-on-write semantics. In another embodiment, the micro-VMi may be implemented inside the VM (i.e., inside a same protection domain as the VM) using, e.g., one or more memory views as described further herein. However, whereas a micro-VM may be restricted to a single guest process, the hardware resources used by that micro-VM, such as memory, may be accessed by a plurality of micro-VMs (and their respective guest processes). As noted, there is only one virtual machine (e.g., the VM) per guest operating system on the endpoint. Typically, the guest operating system running in the VM has one "view" of the memory 220, i.e., "guest-physical" memory, corresponding to one nested page table. Accordingly, as described herein, a same nested page table (i.e., memory view) may be used by a plurality of guest processes, each contained in a separate corresponding micro-VM that uses a same nested page table. However, additional views of memory may be created for each guest process, such as where every view corresponds to a different (i.e., separate) nested page table. Thus, different guest processes may view the guest-physical memory differently (e.g., with different translations or different permissions to the host-physical memory).

In an embodiment, the micro-VM may be implemented as such a view (i.e., a guest-physical memory view) of the memory 220, i.e., controlling the host-physical memory (hardware resource) underlying the guest-physical view of memory. Notably, different guest processes 240 may run in different micro-VMs, each of which is controlled by the (same) guest monitor 352 (also controlling the VM) to thereby enable a global view of execution activity in the guest operating system. The micro-VM thus has properties similar to the typical VM, but with less overhead, i.e., no additional guest monitors. In terms of execution, operation of the guest process is controlled and synchronized by the guest operating system kernel 230; however, in terms of access to hardware resources (managed in host mode), operation of the process is controlled by the guest monitor 352. Access to hardware resources may be synchronized among the micro-VMs and the VM by the guest monitor 352 rather than virtually shared. Notably, certain types of hardware resources, such as memory, may not need express synchronization among micro-VMs. For example, each CPU core may have a single memory view (i.e., set of nested page tables) active at a time, so that express synchronization among memory views is unnecessary. As such, memory views may be assigned to multiple micro-VMs with implicit synchronization.

In an embodiment, the privileged interfaces 305 and 315 may be embodied as a set of defined hyper-calls, each of which is an operation that explicitly calls (explicit transition) into the micro-hypervisor. The hyper-calls may originate from one or more hyper-processes 350 of the virtualization layer 310 and are directed to the micro-hypervisor 320 over the privileged interface 315; alternatively, bi-directional communications may originate from a protected component (e.g., an agent) in the guest operating system directed to the micro-hypervisor (virtualization layer) over the privileged interface 305. A transition from the guest operating system to the virtualization layer 310 is called a VM exit. Such a transition may be implicit, e.g., an intercepted operation or page-protection violation, or explicit, such as a VMCALL instruction from guest mode to host mode. Further, as used herein, an inter-process communication (IPC) message between two hyper-processes requires two hyper-calls (i.e., one for each process) for bi-directional communication.

The policy manager 356 may contain computer executable instructions executed by the CPU 210 to perform operations that associate a protection policy with each guest process 240, as described further herein. The threat protection component 354 may include instrumentation logic implemented as heuristics configured to determine the presence of an exploit or malware in any suspicious guest operating system process (kernel or user mode). To that end, the threat protection component 354 may include software program code (e.g., executable machine code) in the form of instrumentation logic (including decision logic) configured to analyze one or more interception points originated by one or more guest processes 240 to invoke the services, e.g., accesses to the hardware resources, of the guest operating system kernel 230. Illustratively, the threat protection component 354 may contain computer executable instructions executed by the CPU 210 to perform operations that initialize and implement the instrumentation logic.

As used herein, an interception point is a point in an instruction stream where control passes to (e.g., is intercepted by) the virtualization layer 310, e.g., the micro-hypervisor 320. Illustratively, the micro-hypervisor can intercept execution inside the guest operating system at arbitrary points such as (i) inside any guest process, (ii) inside the guest operating system kernel, and/or (iii) on transitions between guest processes and the guest operating system kernel. Malicious behavior may then be analyzed by the virtualization layer (e.g., the threat protection component 354), wherein the behavior may occur anywhere in the guest operating system, including in any guest process or in the guest operating system kernel. The virtualization layer 310 may, thus, place interception points at appropriate instruction stream points, whether in a process or in the kernel.

The guest operating system kernel 230 may be configured to include an operating system (OS) specific extension or agent 360 adapted to communicate with the threat protection component 354. The agent 360 illustratively contains executable machine code in the form of logic configured to provide an interface to the threat protection component 354 that allows introspection (examination and/or interception) of contents of internal structures of the guest operating system kernel 230, as well as semantic context associated with such contents, as described herein. Such virtual machine introspection (VMI) may involve examination of data structures of the guest operating system kernel 230 in a manner that obviates duplication of (i.e., without copying) those structures between the guest and host modes of the virtualization architecture. To that end, the agent 360 may run in host mode ring 3 or guest mode ring 0; however, in an embodiment described herein, the agent 360 illustratively runs in guest mode ring 3. Accordingly, the agent 360 may contain computer executable instructions executed by the CPU 210 to perform operations that implement communication with, and introspection by, the threat protection component 354. For example, identification (ID) of each guest process 240 running in the guest operating system may be obtained from process IDs stored in a data structure, e.g., the process table 245, of the guest operating system. Instead of having to probe that data structure and with knowledge to extract its contents, the threat protection component 354 can instruct the agent to examine the process table 245 and provide the ID of the guest process 240. That is, the agent 360 operating in the guest mode may act on behalf callers (e.g., guest monitor 352) operating in the host mode to access (i.e., probe) data structures in the guest mode with knowledge to extract its contents. Accordingly, the agent may be configured with knowledge of the guest O/S data structures. Alternatively, the threat protection component may examine directly the memory used by the guest O/S (i.e., virtual machine introspection) to determine locations (and layout) of the process table 245 so as to determine the ID of the guest process 240. Illustratively, threat protection component 354 may communicate with the guest operating system (i.e., the agent 360) over a defined application programming interface (API) 365.

As a light-weight module, the micro-hypervisor 320 may provide a virtualization layer having less functionality than a typical hypervisor. Therefore, as used herein, the micro-hypervisor 320 is a module that is disposed or layered beneath (underlying, i.e., directly on native hardware and operating at a highest privilege level of that native hardware) the guest operating system kernel 230 and includes the functionality of a micro-kernel (e.g., protection domains, execution contexts, capabilities and scheduling), as well as a subset of the functionality of a hypervisor (e.g., management of virtual CPUs and their states, management of the MMU, IOMMU and other security-critical devices, as well as hyper-calls to implement a virtual machine monitor). Accordingly, the micro-hypervisor 320 may cooperate with the guest monitor 352 to provide additional virtualization functionality in an operationally and resource efficient manner. Unlike a type 1 or type 2 VMM (hypervisor), the guest monitor 352 is illustratively a type 0 VMM (VMM 0) that does not fully virtualize the hardware resources of the node 200, while supporting execution of one entire operating system/instance inside one virtual machine, i.e., the VM. The guest monitor 352 may thus instantiate the VM as a container for the guest processes 240, as well as the guest operating system kernel 230 and its hardware resources. Illustratively, the guest monitor 352 is a pass-through module configured to expose the hardware resources of the node (as controlled by micro-hypervisor) to the guest operating system kernel 230. Yet, virtualization processing in response to a VM exit (and a resulting transition of control flow from the guest operating system to the micro-hypervisor) may be performed by the guest monitor. To that end, the micro-hypervisor 320 may enable communication between the guest operating system (i.e., the VM) and the guest monitor over privileged interfaces 305 and 315.

In an embodiment, the micro-hypervisor 320 may include a plurality of data structures, such as objects 330 and capabilities 342, configured to provide security and isolation features associated with the virtualization architecture 300. Illustratively, the objects 330 include one or more protection domains 332, execution contexts 334 and scheduling contexts 336. As used herein, a protection domain 332 is a kernel mode object that implements spatial isolation among the hyper-processes of the virtualization layer and includes a representation of a security privilege associated with each hyper-process 350 that is enforced by the micro-hypervisor 320. Illustratively, each hyper-process 350 in the virtualization layer 310 runs in a separate protection domain 332. An execution context 334 is illustratively a representation of a thread associated with the hyper-process 350 and, to that end, defines a state of the thread for execution on the CPU 210. In an embodiment, the execution context 334 may include inter alia (i) contents of CPU registers, (ii) pointers/values on a stack, (iii) a program counter, and/or (iv) allocation of memory via, e.g., memory pages. The execution context 334 is thus a static view of the state of thread and, therefore, its associated hyper-process 350. For the thread to execute on a CPU, its execution context is tightly linked to a scheduling context 336, which may be configured to provide information for scheduling the execution context 334 for execution on the CPU 210. Illustratively, the scheduling context information may include a priority and a quantum time for execution of its linked execution context on CPU 210.

The micro-hypervisor 320 also includes a per-protection domain (PD) capability space 340 that contains capabilities 342A-N, wherein each capability 342 is a pointer to an object 330 having associated permissions (i.e., privileges). Hyper-processes 350 of the virtualization layer 310 do not have the ability to work with the capabilities 342 directly, i.e., they cannot read the pointer or privileges directly and can only refer to those capabilities using a capability selector 345, e.g., an integral number. To invoke a specific capability, a hyper-process 350, such as the guest monitor 352, may issue a hyper-call request (e.g., over interface 315) to the micro-hypervisor 320, wherein the request includes an action (e.g., "send a message" or "delegate a capability") along with a corresponding capability selector, i.e., an index such as N, that identifies (names) the object 330 involved in the hyper-call. Illustratively, the capabilities 342 are used to name the object on which the hyper-call operates and, at the same time, convey the access permissions of the calling hyper-process on that object. In response to the request, the micro-hypervisor may access the per-PD capability space 340 to select the requested capability 342N, which names (e.g., points to) the object (e.g., scheduling context 336) on which the action is performed.

Illustratively, a capability 342 is a concept that is only known in the virtualization layer 310, i.e., the guest operating system is unaware of the capability. The capability 342 is essentially a mechanism to enforce security privileges among the hyper-processes 350 of the virtualization layer 310. Notably, each hyper-process 350 is provided only a minimal set of capabilities 342 necessary for that component to perform its assigned function. For example, the guest monitor 352 may have the capability to access the VM, while only the threat protection component 354 may have the capability to communicate with the guest monitor 352 and policy manager 356. Thus, an attacker that is able to compromise a hyper-process (protection domain 332) would only be able to inflict damage associated with the capabilities 342 held by that protection domain 332.

As described herein, certain events or activities, e.g., attempted access to hardware resources, of a guest process 240 may be treated as interception points that allow the virtualization layer 310 to further monitor or instrument the process using a spawned micro-VM. A system call is an example of an interception point at which a change in privilege modes or levels occurs in the guest operating system, i.e., from guest mode ring 3 (a lowest level of guest mode privilege) of the guest process 240 to guest mode ring 0 (a highest mode of guest mode privilege) of the guest operating system kernel 230. The guest monitor 352 may intercept the system call and examine a state of the process issuing (sending) the call. The instrumentation logic of threat protection component 354 may analyze the system call to determine whether the call is suspicious and, if so, instruct the guest monitor 352 to instantiate (spawn) one or more micro-VMs, managed by the guest monitor in cooperation with the threat protection component, to detect anomalous behavior which may be used in determining an exploit or malware.

As used herein, an exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe a malicious attack, and encompass both malicious code and exploits detectable in accordance with the disclosure herein.

Memory Virtualization

Figure 4:
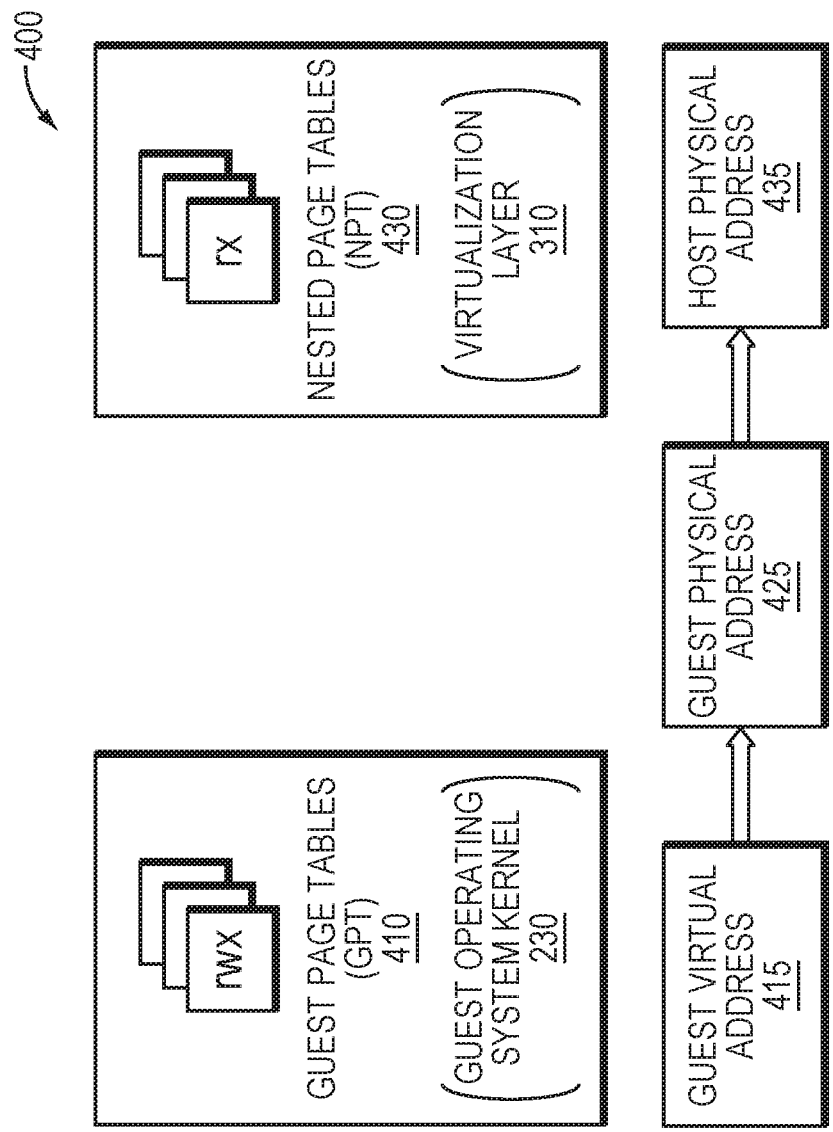
FIG. 4 is a block diagram illustrating memory virtualization that may be advantageously used with one or more embodiments described herein.

FIG. 4 is a block diagram illustrating memory virtualization 400 that may be advantageously used with one or more embodiments described herein. The guest operating system kernel 230 may create one or more sets of guest page tables (GPT) 410, wherein there is typically one set of guest page tables per guest process 240 that perform a first translation from a guest virtual (linear) address 415 to a guest-physical address 425. Each guest process 240 typically runs in its own address space of guest-virtual addresses; to that end, the guest operating system kernel 230 creates one or more guest page tables 410, e.g., in the form of a guest page table hierarchy, associated with the address space of the guest process 240. When switching guest processes for execution on the CPU 210 during a context switch, the guest operating system kernel 230 swaps a prior guest page table hierarchy (of a prior process) for the guest page table hierarchy of the (current) process to be executed.

Virtualization provides one or more additional page tables, i.e., nested page tables (NPT) 430, layered underneath (i.e., nested with) the GPT 410. The nested page tables 430 may be utilized to perform a second translation from the guest-physical address 425 to a host-physical address 435, wherein the host-physical address 435 is an address used to access (physical) main memory 220. The translation of guest-physical address 425 to host-physical address 435 may be flexible, i.e., such translation may be implemented on a per page basis to determine how each guest-physical address 425 is translated to a host-physical address 435. Illustratively, translation from guest-physical addresses to host-physical addresses is controlled by the virtualization layer 310 to establish a mapping from the guest-physical addresses used in a VM (e.g., the VM) to a host-physical address in main memory 220.

In an embodiment, guest page tables 410 are part of a guest page table hierarchy that is controlled by the guest operating system kernel 230, and the nested page tables 430 are part of a nested page table hierarchy that is controlled by the virtualization layer 310, e.g., managed by the micro-hypervisor 320 in cooperation with the guest monitor 352. In one arrangement where the MMU hardware supports nested paging, the page table hierarchies may be organized as a two-stage (i.e., layered) translation arrangement of the (physical) MMU 215 (supporting a virtualized MMU via two-level page table hierarchies), where the page tables define the translation of a guest-virtual address 415 to a guest-physical address 425 (a first stage defined by the GPT) and, ultimately, to a host-physical address 435 (a second stage defined by the NPT). There, the guest operating system kernel 230 manages the guest page tables 410, the virtualization layer 310 manages the nested page tables 430, and the nested page tables are consulted by the MMU after the guest page tables. Hence, the nested page tables may be used to override permissions.

In an alternative arrangement where the MMU hardware does not support nested paging (e.g., it can only perform one-level translation), the guest page tables may be organized as a shadow page table arrangement synchronized with the nested page table hierarchy such that the shadow page tables provide guest-virtual address to host-physical address translations that are updated with changes to the guest page table hierarchy or nested page table hierarchy. The virtualization layer 310 is responsible for folding the guest page tables 410 (managed by the guest operating system kernel 230) and the nested page tables 430 (managed by the virtualization layer) together to create the shadow page tables so as to perform end-to-end translation from guest-virtual addresses to host-physical addresses. The MMU 215 then uses the shadow page tables for translating guest-virtual addresses to host-physical addresses as a single level translation. Accordingly, the shadow page tables are updated when the guest page tables or nested page tables change. It should be noted that either arrangement may provide additional functionality, wherein each translation stage may define access permissions on a page granularity. That is, for each page referenced by a page table, access permissions may be specified as to whether the page is readable (r) writeable (w), or executable (x). Note that sub-page protection may implemented when the MMU only provides page-granularity by write protecting a page having the sub-page to be protected and for any write violations that occur to non-protected portions of the page (i.e., outside the sub-page being protected), perform the write operation to that portion of the page on behalf of the guest O/S.

In an embodiment, the "ultra" (ultimate) translation to physical memory of the two-stage arrangement, i.e., the translation from guest-physical address 425 to host-physical address 435, may be employed to overwrite any page permissions that the guest operating system kernel 230 has defined. For example, assume the guest operating system kernel 230 has defined, using the GPT, a certain read (r), write (w), execute (x) mapping for a guest-virtual address 415 to guest-physical address 425 of a page accessible by a guest process 240, so that the guest process 240 may expect that it can actually read, write and execute that page. Yet, using the nested page tables 430 (i.e., layered beneath the GPT), the virtualization layer 310 may alter or change those permissions to be write protected, i.e., read-only (r) and execute (x) with no write permission, for the actual (host) physical page that the guest operating system kernel 230 (and guest process 240) may attempt to access. Therefore, any time that the guest process 240 attempts a write access to the page, an access violation of the nested page tables occurs, resulting in a VM exit (e.g., a transition) that returns control to the virtualization layer 310. Note that for the shadow page table arrangement, the violation occurs for a shadow page acting as a condensed two-stage address translation. In response to determining that the attempted write access is to a physical page that is write protected, the virtualization layer 310 may take action, such as emulating the access, making the page writeable, shadow copying the write, or completely nullifying the effects of that access. As another example, assume the guest operating system kernel 230 has marked the page as non-executable. The virtualization layer 310 may render the page executable or emulate the instruction that would have been executed if the page had been executed.

Memory Views

As noted, the micro-VM may be implemented as a view of the memory 220 (memory view) embodied as nested page table address mappings that control the host-physical memory underlying the guest-physical view of memory. Accordingly, the memory view is a hardware resource (i.e., a set of NPT tables) used by the micro-VM as a container (i.e., constraining access to memory) for one or more guest processes. The address space of each guest process 240 may be represented by the combination of the GPT and a memory view (e.g., NPT address mappings). Different guest processes 240 may run in different memory views, each of which is controlled by the guest monitor 352 associated with the VM to thereby enable a global view of execution activity in the guest operating system. In an embodiment, each memory view may have its own nested page table hierarchy that describes the guest-physical memory layout of the view (i.e., micro-VM); accordingly, the VM may implement one or more micro-VMs as memory views through different NPTs 430 of the nested page table hierarchies. A protection profile of each guest process, as described further herein, defines in which memory view (micro-VM) that guest process runs. The guest operating system kernel 230 and hardware resources may then be mapped into the memory views to ensure synchronization when accessing the guest operating system kernel and resources.

Figure 5:
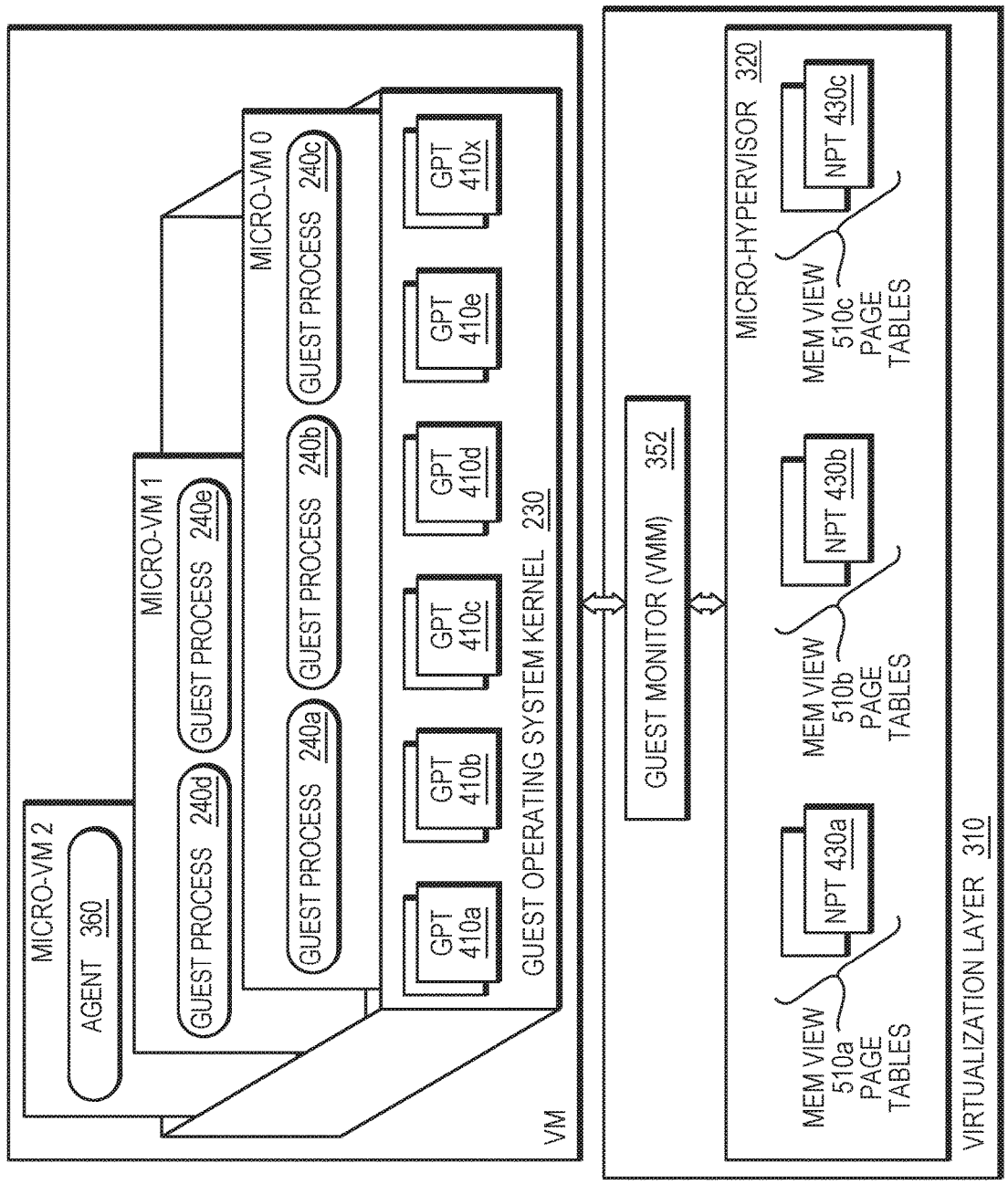
FIG. 5 is a block diagram illustrating one or more memory views that may be advantageously used with one or more embodiments described herein.

FIG. 5 is a block diagram illustrating one or more memory views that may be advantageously used with one or more embodiments described herein. In an embodiment, each guest process 240 runs in a micro-VM that encompasses an address space associated with a set of GPTs 410 of a guest page table hierarchy as controlled by the guest operating system kernel 230. For example, guest processes 240a,b,c run in micro-VM 0, wherein each guest process 240a,b,c has an address space associated with GPTs 410a,b,c, respectively. Similarly, guest processes 240d,e run in micro-VM 1, wherein each guest process 240d,e has an address space associated with GPTs 410d,e, respectively, and agent 360 runs in a micro-VM 2 having an address space associated with GPTs 410x. Moreover, each micro-VM may be implemented in the micro-hypervisor as a memory view 510 having an associated nested page table hierarchy.

Illustratively, each memory view 510 has its own set of NPTs 430 of a nested page table hierarchy associated with a micro-VM that describes the guest-physical memory layout of that view as controlled by the virtualization layer 310, e.g., managed by micro-hypervisor 320 in cooperation with the guest monitor 352. For example, memory view 510a has NPTs 430a associated with micro-VM 0, memory view 510b has NPTs 430b associated with micro-VM 1, and memory view 510c has NPTs 430c associated with micro-VM 2. As such, the VM may include one or more micro-VMs each having different nested page table hierarchies. Accordingly, one or more guest processes 240 along with the guest operating system kernel 230 run in a micro-VM, i.e., guest processes 240a,b,c and guest O/S kernel 230 run in micro-VM 0, guest processes 240d,e and guest O/S kernel 230 run in micro-VM 1, and agent 360 and guest O/S kernel 230 run in micro-VM 2.

When the guest operating system kernel 230 switches from one guest process 240 to another, the guest monitor 352 (VMM) observes the guest process switch and, in response, instructs the micro-hypervisor to swap (switch) to the NPT 430 that implements the memory view to which the switched process is assigned. Thus, if the guest monitor 352 observes a guest process switch from guest process 240a to guest process 240c (or from guest process 240d to guest process 240e), no NPT switching occurs and the memory view remains unchanged. However, in response to observing a guest process switch from guest process 240c to guest process 240e, the guest monitor 352 (in cooperation with the micro-hypervisor) switches from NPT 430a to NPT 430b. Likewise, in response to observing a switch from guest process 240d to the agent 360, the guest monitor switches from NPT 430*b* to NPT 430*c*. Because the guest operating system kernel 230 is mapped in all nested page table hierarchies, a change from one memory view (micro-VM) to another does not change the state of the guest operating system kernel, i.e., it appears as if the guest operating system kernel 230 "moves" from one memory view to another.

Advantageously, the assignment of guest processes to memory views (micro-VMs) is flexible and efficient. For example, guest processes that belong to a particular (default) protection profile may run in memory view 510*a* where the entire memory is visible, e.g., in guest mode, and no permissions have been overridden. Certain other guest processes may require a higher degree of protection/monitoring and may be assigned to memory view 510*b* where the guest monitor 352 may tighten (i.e., restrict) permission to certain memory pages. Likewise, certain trusted processes, such as agent 360, may be assigned to memory view 510*c* where certain memory pages are visible (i.e., accessible) that are not visible in the other memory views. In sum, one or more guest processes may be assigned to each memory view and a guest process may also be reassigned from one memory view to another.

Guest Process Protection

The embodiments described herein provide a technique for protecting guest processes 240 of guest operating system kernel 230 on a virtual machine (e.g., the VM) using the virtualization layer 310. As noted, the virtualization layer 310 may include a user mode portion having hyper-processes 350 and a kernel portion having the micro-hypervisor 320. Illustratively, the micro-hypervisor may cooperate with the hyper-processes of the virtualization layer 310 to protect the guest processes 240 against attack by one or more exploits that may employ malware. To that end, the guest process protection technique enables the micro-hypervisor and/or hyper-processes of the virtualization layer to determine (i) when the guest operating system switches to a guest process for execution, (ii) an identity of the guest process, and (iii) a protection policy to be associated with the guest process identity.

Figure 6:
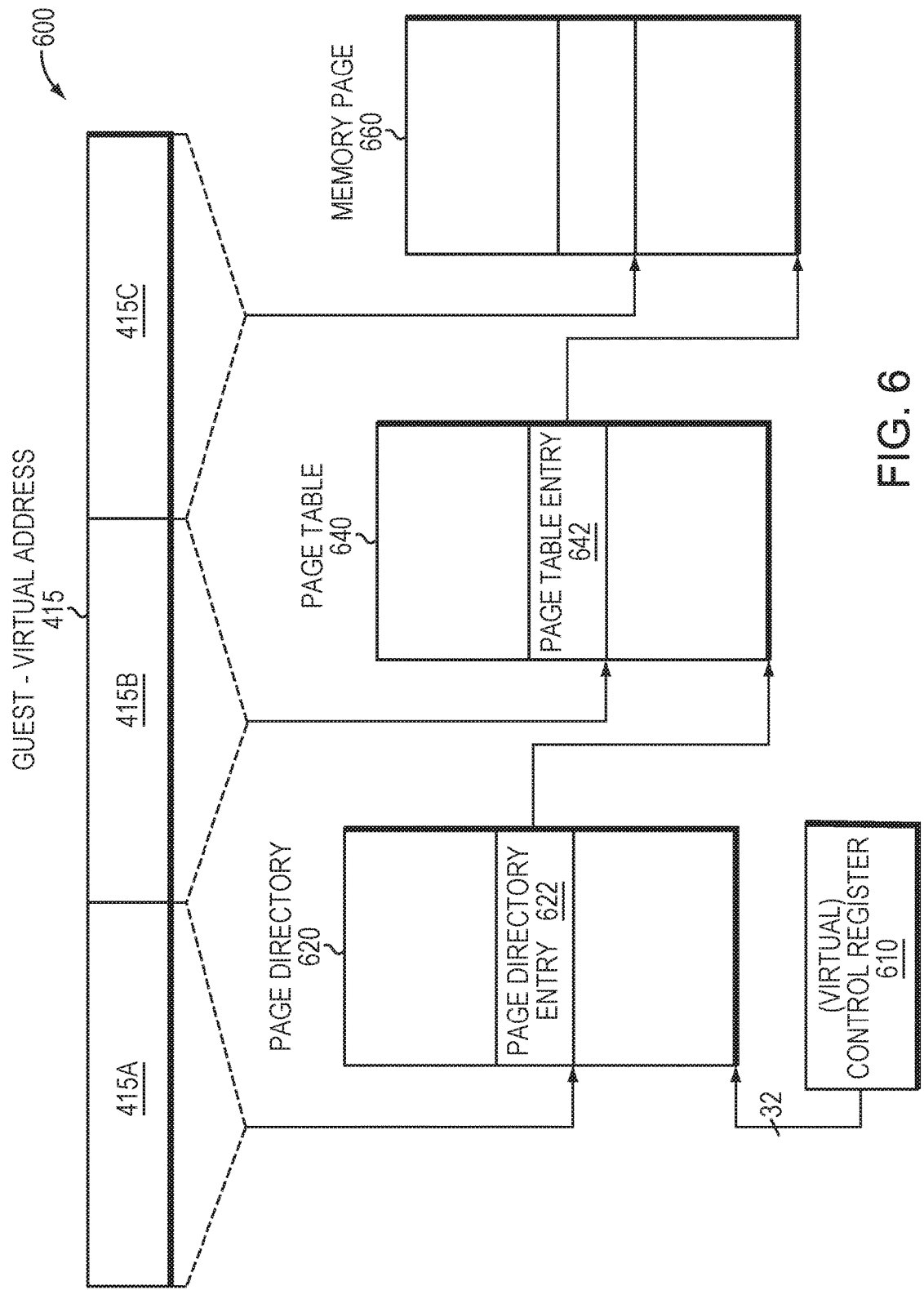
FIG. 6 is a block diagram of a guest page table hierarchy including a control register that may be advantageously used with one or more embodiments described herein.

Switching to a guest process 240 for execution on CPU 210 may be determined using a control register of the CPU that is associated with a guest page table hierarchy. FIG. 6 is a block diagram of the guest page table hierarchy 600 including the control register that may be advantageously used with one or more embodiments described herein. As a hardware resource, the control register is virtualized by the virtualization layer 310 (i.e., the guest monitor 352) to create a virtual instance of the register in the VM; that is, the (physical) control register is virtualized as a virtual control register 610 for use by the guest operating system kernel. The two-stage translation arrangement may employ one guest page table hierarchy 600 per guest process 240; illustratively, a root (base) address for the guest page table hierarchy 600 is stored in the virtual control register 610 as defined by the CPU (processor) architecture. As noted, the processor architecture described herein is illustratively based on the x86 CPU and, accordingly, the virtual control register 610 may be embodied as CR3, which stores the base address of a page directory 620 associated with the guest page table hierarchy 600. Therefore, the content (value) of virtual control register (CR3) may be interpreted to represent the guest page table hierarchy 600 of the currently executing guest process 240 on a processor core of the VM.

In an embodiment, each processor core of CPU 210 has its own virtualized control register to enable access to the guest address space of the guest process 240. Thus, each value of the virtual control register (CR3) may reference (point to) a hierarchy of guest page tables, which list or enumerate all memory pages 660 in the guest virtual (linear) address space of the process 240. For example, the virtual control register 610 points to the base address of the page directory 620 of the hierarchy 600 and a first field 415A (e.g., predetermined high-order bits) of a guest-virtual address 415 points to a page directory entry of the page directory 620. The page directory entry 622 then points to the base address of a page table 640, while a second field 415B of the guest-virtual address 415 points to a page table entry 642 of the page table 640. The page table entry 642, in turn, points to the base address of a memory page 660 and a third field 415C (e.g., predetermined low-order bits) of the guest-virtual address 415 points to the guest-physical address 425 (offset) within the page 660. A similar hierarchy may be provided for the nested page tables 430 to translate the guest-physical address 425 to a host-physical address 435. In addition, the x86 CPU may support virtualized MMUs via a two-level page table hierarchy that provides layering (i.e., nesting) such that the virtual control register (CR3) provides a root for a first level of page tables (i.e., guest page table hierarchy) and a nested page table control register (EPT/NPT pointer) provides a root for a second level of page tables (i.e., nested page table hierarchy). Illustratively, the nested page tables are extended page tables (EPT) in x86 CPU from Intel and the NPT control register is an EPT base pointer register in the x86 CPU. As such, the EPT pointer may be accessible (i.e., visible) only to the virtualization layer, i.e., the root pointer of the second level of page tables (NPT) is not virtualized in the VM, so that the NPT control register (e.g., EPT base pointer) is invisible in the guest mode. Note that other CPU architectures, such as the x64 CPU from Advanced Micro Devices and the ARM CPU from ARM Holdings, may provide a similar two-level page table hierarchy with separate root pointer registers for each level.

In accordance with the guest process protection technique, the virtualization layer 310 (micro-hypervisor 320) is configured to intercept write accesses by the guest operating system kernel 230 to the virtual control register 610 to record changes to the content (value) of the register. That is, the virtual control register 610 is used to detect, e.g., at the virtualization layer 310, switching of guest processes 240 in the guest operating system. Specifically, the guest process protection technique is directed to use of a virtualized hardware resource, i.e., control register 610 whose content is changed (altered) on every guest process context switch in a VM (e.g., the VM), wherein a VM exit to the virtualization layer 310 is triggered when the content of that register changes. Illustratively, the control register is CR3 of x86 CPUs, although the technique may apply similarly to other CPU architectures (e.g., the x64 CPU from Advanced Micro Devices), because operating systems generally run each guest process in a separate virtual address space and the virtual-to-physical address space translation uses page tables hierarchies.

Switching from one process to another therefore requires switching page tables, which are rooted in the virtual control register 610. In an embodiment, intercepting access to that register enables determination of a switch from one guest page table hierarchy to another, which can be interpreted as a guest process switch. That is, upon detecting the guest operating system loading a new root address (value) into the virtual control register CR3, the virtualization layer 310 may determine that the guest operating system is activating a new set of guest page tables 410 and, thus, switching from a prior guest process associated with the prior guest page table hierarchy to the (new) guest process associated with the (new) guest page table hierarchy. The virtualization layer 310 may then determine the identity of the guest process associated with the guest page table hierarchy to enable a decision of whether to, e.g., protect or monitor the process.

Determination of the identity of the guest process requires, inter alia, distinguishing among other guest processes executing in the guest operating system. The virtualization layer 310 typically cannot determine the memory pages used by the guest processes 240, so as to distinguish among those processes by, e.g., determining their type or associated data structures, because the memory pages used for each guest process are stored in data structures known only to the guest operating system. However, the virtualization layer may obtain semantic context, such as read or write information, about a memory page 660 when accessed by a guest process 240 so as to determine the identity of that guest process. As such, in one or more embodiments, the guest process protection technique described herein may employ various approaches to determining the identity of the guest process using such semantic context.

A first approach involves the use of the agent 360 (i.e., an in-guest operating system component) to probe the guest processes 240 and communicate with the virtualization layer 310 (i.e., the threat protection component 354) regarding location and semantics of certain guest operating system data structures. As noted, the agent 360 is an operating system extension module that cooperates with the virtualization layer 310 to provide certain information, such as process creation and destruction. For example, when a new guest process is created in the guest operating system, the agent 360 may identify the process to the virtualization layer via activation of a guest page table hierarchy 600. That is, the agent may examine the process table 245 to acquire the identity of the new guest process 240 and then inform the virtualization layer 310 that the corresponding value of the virtual control register that points to the guest page table hierarchy 600 belongs to the new guest process 240. Upon destruction of the process, the agent may inform the virtualization layer to no longer track the value of the virtual control register because the corresponding process has been destroyed. Note that any process (including the agent) running at the guest mode privilege level operates at a same privilege level of the virtualization architecture 300 as an attacker and, thus, may be compromised (e.g., infiltrated) by the attacker. However, as described herein, the guest process protection technique may protect the agent 360 when operating in the guest mode privilege level.

A second approach to determining a guest process involves implementation of guest operating system specific knowledge in the virtualization layer. Illustratively, this approach may involve the use of virtual machine introspection (VMI) by the virtualization layer 310 to probe the memory of a VM for purposes of examining (i.e., parsing) guest operating system specific data structures to determine their layouts and linkages (i.e., memory forensics). For example, assume the virtualization layer 310 probes the VM memory (i.e., memory allocated to the VM) to parse guest operating system internal data structures, such as the PCB 235. Parsing of the PCB 235 for a guest address space may reveal a field having a path that includes a name for a guest process 240. The virtualization layer 310 may then deduce the identity of the guest process from the process name. Such sematic parsing may be implemented in the threat protection component 354 of the virtualization layer 310, which operates in host mode privilege level of the virtualization architecture 300 and, thus, beyond the privilege level of an attacker, which is typically at the privilege level of guest operating system. However, this approach is also operating system specific and, therefore, may be unreliable because a guest operating system upgrade or patch that changes the layouts of the data structures may result in misinterpretation of their content.

Figure 7:
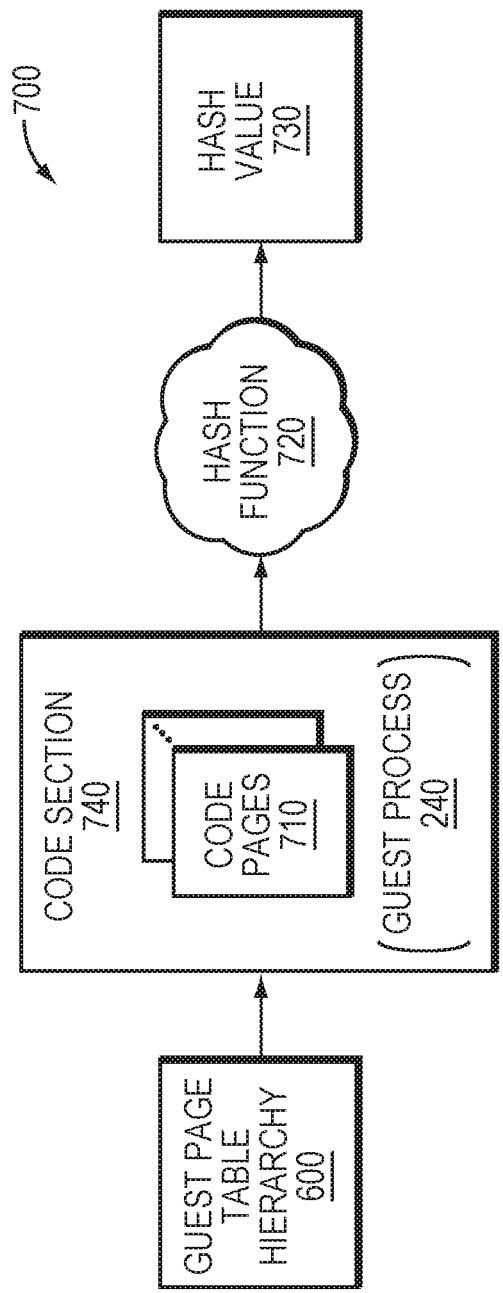
FIG. 7 is a block diagram of a content analysis approach of a guest process protection technique that may be advantageously used with one or more embodiments described herein.

A third approach involves content analysis of the guest process 240, wherein one or more code pages of the process as marked by the guest page table hierarchy 600 are hashed to identify the process, i.e., the one or more code pages may be "fingerprinted" (hashed) so as to identify the process. FIG. 7 is a block diagram of the content analysis approach 700 of the guest process protection technique that may be advantageously used with one or more embodiments described herein. The virtualization layer 310 (i.e., the threat protection component 354) may perform the content analysis by examining the guest page table hierarchy 600 (rooted by register 610) to select all code pages 710 of the guest process 240 that are marked executable and hashing those pages (e.g., in accordance with hash function 720) to effectively hash (i.e., fingerprint) the code section 740 of the process. Accordingly, hashing of any instances of the guest process should produce a hash value 730 that is identical to a pre-computed hash value for the process taken into account any memory relocation of the process, as each instance of the guest process has an identical code section. As a result, if a hash function 720 having a substantially low collision rate is used to hash the code section 740 of a guest process 240 to produce a hash value 730 that is known (e.g., via a pre-computed hash value for the process), then the identity of the guest process can be determined from the known hash value. Monitoring and hashing of code pages 710 of guest processes 240 may also be performed to compare the resulting hashes or "signatures" against a database containing versions of known guest processes that have been accumulated over time so as to rapidly identify the processes and to perform a more thorough analysis, e.g., heuristic malware analysis.

It should be noted that the content analysis approach may be difficult to implement because hashing often cannot be performed on the entire guest process. As noted, the guest operating system has the ability to page the guest process 240; accordingly, a portion (not all) of the code pages 710 for the process may reside in main memory 220. For example, when the virtualization layer 310 first detects switching of the process into memory, the guest operating system may have only loaded one page from disk, i.e., the entire guest process image may not be present in memory 220. Nevertheless, during a VM exit or transition (switch) in privilege levels from guest mode to host mode, the virtualization layer 310 may use a current instruction pointer (e.g., via a program counter in a processor core of the VM) in the guest mode to determine from which code page 710 the process is executing. A hash value 730 may then be computed on a per page basis, wherein the hash values 730 of code pages 710 at particular guest (virtual) addresses are compared with hash values of codes pages at similar addresses of other guest processes to substantially reduce a number of candidate guest process identities, i.e., multiple candidate identities of a process from differing portions of the codes pages for that process.

Although the content analysis approach may include comparison of code page hashes with corresponding hashes of known (benign) guest processes to determine the identity of a guest process, the approach may be extended to determine when the guest process has been (suspiciously) modified. Such modification may trigger a raising of a suspiciousness level of the virtualization layer 310 if the comparison with known hashes does not match and, consequently, possible initiation of further instrumentation of the suspiciously modified process. For example, assume an attacker copies a code page 710 that was previously identified as a code page of a guest page table 410 for a guest process 240 and makes a minor change to the new (copied) page, as well as alters the page table to point to the new code page, i.e., effectively swapping the code page with the new modified code page. Since the technique described herein hashes pages and not page tables, the content of the different page that the altered page table references may be hashed to identify the process assuming, e.g., that the new code page is recently loaded from disk and, thus, is authentically part of the process. However, if the modified content of the code page includes the same code as the original code of the original page, the resulting hash value 730 may be the same. Moreover, the behavior of the guest process 240 is the same because the original code was replaced with a copy of that code, albeit on a separate memory page, i.e., the process still behaves in an expected way. Yet, if the attacker sufficiently modifies content of the guest process, e.g., changes a jump target to another address location, the modification may be reflected in the code page 710 and as a change in the resulting hash value 730. Although the changed hash value may not be known and may be assumed to be a recently loaded authentic code page, the virtualization layer 310 may monitor (instrument) multiple different pages to compute a likelihood of a particular identity of the guest process, e.g., where a substantial number (99%) of the pages appear to resemble the guest process. As such, when one or more pages (i.e., a threshold of pages) appear odd (i.e., do no match an existing hash for a code page of the process), the virtualization layer 310 may surmise (i.e., determine) that the guest process 240 is being attacked.

Once the identity of one or more guest processes are determined, mappings may be established and maintained in the virtualization layer 310 that associate particular instances of the processes with particular values of the virtual control register (CR3) 610. Such mappings enable the virtualization layer to name the different guest process instances solely by their virtual control register (CR3) values and, thus, distinguish the processes. The mapping may be established using any of the approaches described herein upon detecting (for the first time) the guest operating system switching to a virtual control register value that is unknown to the virtualization layer. For example, upon detecting creation of a new guest process, the agent 360 may inform the virtualization layer 310 as to the value of the virtual control register for the process 240. Since the guest process is unknown, the virtualization layer may perform an analysis on the guest page tables 410 or data structures to determine the identity of the process and then map the process to the virtual control register value.

Figure 8:
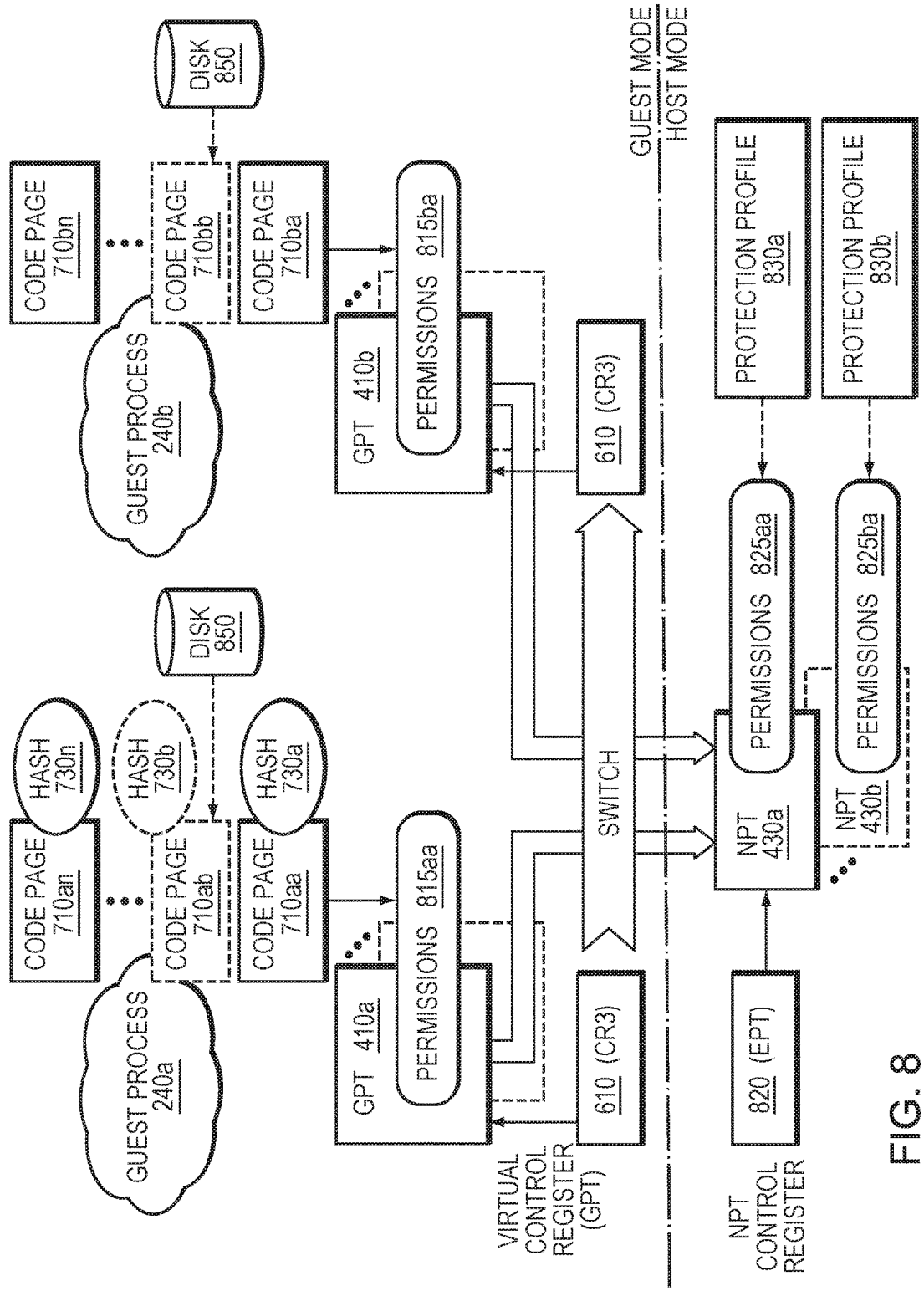
FIG. 8 is a flow diagram illustrating application of a protection policy when switching to the guest process.

Upon determining an identity of a guest process, the virtualization layer 310 may associate a protection policy with the guest process identity. FIG. 8 is a flow diagram illustrating application of the protection policy when switching to the guest process. In an embodiment, the policy manager 356 of the virtualization layer may be configured to associate a protection policy with each process identity. In one or more other embodiments, the guest monitor 352 and the threat protection component 354, as well as the policy manager 356 may cooperate to define the protection policy, which may be embodied as a protection profile 830 for the guest process. According to the technique, the protection profile 830 may (i) contain information about events that are intercepted by the virtualization layer, wherein the intercepted events may involve certain instructions or accesses, (ii) contain a reference to a nested page table hierarchy associated with the guest process, i.e., define the memory view in which the guest process runs (and to which the guest process is bound), and (iii) specify restrictions (e.g., embodied as permissions of nested page tables of the nested page table hierarchy) to be applied when the process is active. For example, assume that a guest process 240 may have known vulnerabilities, wherein exploits that target the process may exhibit similar behavior, such as overflowing a stack of the process. As a result, the protection profile applied to the process by the virtualization layer 310 may state that when the process is created or activated, apply permissions that render the stack non-executable.

More generally, the virtualization layer 310 may apply the protection profile 830a to override permissions 815aa of a page 710aa as defined by the guest page table (GPT) hierarchy 410a using higher priority permissions 825aa enforced by the nested page table (NPT) hierarchy 430a for that page on a per process (e.g., 240a,b) basis. For example, even though the guest operating system kernel 230 may mark the stack executable (i.e., pages of the stack have permissions in the GPT allowing execution) for a particular guest process 240, the virtualization layer 310 may render the stack non-executable (i.e., the pages of the stack have permissions in the NPT preventing execution) in host mode for that process. Alternatively, if the guest operating system kernel marks certain code pages 710aa of the process as writeable (e.g., permissions 815aa), the virtualization layer 310 may write protect those pages (i.e., mark the pages non-writable in permissions 825aa) in host mode. Although the protection profile 830a,b may apply different permissions (restrictions) for different instances of the guest process 240a,b, it is possible to apply similar restrictions for all instances of the process (e.g., a same protection profile enforcing identical permissions 825 of NPT 430). Note that whereas GPT permissions 815aa,ba may be associated with the GPT 410a,b for each guest process 240a,b along with a virtual control register value (i.e., root pointer to the respective GPT), the NPT 430a may be associated with a memory view (micro-VM) of the virtual machine (e.g., the VM) running the guest operating system so that the NPT permissions 725aa,ba may be applied to the NPT 430a of a nested page table hierarchy.

As noted, certain events or activities, e.g., attempted access to kernel resources, of a guest process 240 may be treated as interception points that allow the virtualization layer 310 to further monitor or instrument the process using a spawned micro-VM. In an embodiment, a hyper-breakpoint may be employed in connection with the protection profile to trigger an interception point. For example, upon activation of the guest process in the guest operating system, a hyper-breakpoint may be inserted in a code page 710 at an entry location (address) of a certain function, e.g., to check if the stack is intact or if a function is being called correctly from the proper address. If insertion of the breakpoint in the code page is detected, an attacker may refrain from any malicious activity, which is desirable as it deters that activity. However, if the hyper-breakpoint is not detected, the guest process protection technique described herein may employ the protection profile for the guest process to specify restrictions to be applied to the nested page table 430 when the process is active. For example, the virtualization layer 310 may modify the nested page table 430 to render the code page 710 execute-only, but not readable nor writeable, and insert a hyper-breakpoint in the page. When accessing the page, the guest process (or a version thereof that is compromised by an attacker) may traverse the hyper-breakpoint, which triggers an exit or switch to the virtualization layer. In particular, when the compromised process attempts to read the page, e.g., to detect whether it has been modified or instrumented, an interception point, such as a trap (e.g., NPT violation), may be invoked into the virtualization layer 310.

Upon trapping, the virtualization layer 310 may proceed in accordance with one or more options. One option may be to undo the breakpoint, restore the original content of the code page 710 and allow the compromised guest process to read the original content. The attacker may then determine that the content of the page is as expected and proceed accordingly. A second option may be to leave the page execute-only and emulate the effects of the read access (instruction) using, e.g., the instruction emulator of the guest monitor 352 for device accesses. Software emulation of the read instruction may obviate native execution of the instruction on the CPU 210, but may also allow the virtualization layer 310 to simulate the original content of the code location (i.e., return the original content as a result for the read of the location), thereby masking the hyper-breakpoint from the guest mode. For both options, the attacker may observe the expected value, while the hyper-breakpoint remains invisible to the guest process (or other processes) within the guest operating system (i.e., in guest mode).

In another embodiment, the hyper-breakpoint may be used in a situation where certain processes are activated. Here, the breakpoint may be applied not only in a user-space code section of the process (i.e., guest mode ring 3) but also in kernel-space (i.e., guest mode ring 0) to determine whether a guest process is calling certain APIs. For example, assume that the guest process 240 is not expected to access the network, e.g., via network interface 260. The virtualization layer 310 may insert a hyper-breakpoint on all systems calls to the guest operating system kernel 230 that have network-related functionality. If the process exhibits deviant (i.e., anomalous or malicious) behavior and attempts to access the network interface 260, the virtualization layer 310 may observe the process 240 issuing a system call related to the network and may classify this access as suspicious and, thus, respond accordingly.

The protection profile may also be used to protect certain properties of a guest process. Assume the in-guest component, i.e., the agent 360, is configured to call into and inform the virtualization layer 310 when a suspicious guest process 240 is activated (switched) in the guest operating system so that the virtualization layer can monitor the process. The agent 360 may also be configured to notify the virtualization layer when the guest process 240 is terminated or destroyed so that the virtualization layer can stop monitoring the process. However, an attacker could compromise the agent 360 and replace the call to the virtualization layer with other code that avoids announcing the process as suspicious, thereby evading detection. In other words, the attacker could modify the agent code in such a way that a process created by the attacker is not announced to the virtualization layer 310. However, such evasion may be innocuous because once the process is created and activated, a resulting change to the virtual control register (CR3) value may be detected by the virtualization layer. Nevertheless the attacker could further modify the agent code to inform the virtualization layer that the guest process associated with a particular CR3 value is benign so that the virtualization layer would only apply minimal protection and monitoring of the process. Thus, there is need to protect the agent against tampering, illustratively through use of the protection profile 830.

In an embodiment, the agent 360 may identify itself, e.g., upon initialization or startup in the guest operating system by issuing a call into the virtualization layer 310. In response, the virtualization layer may confirm the identity of the agent by comparing a hash value 730 of the entire code section 740 (executable code pages 710) of the agent with an expected hash value of that code section (i.e., a hash of all code pages of the agent). Once the identity of the agent is confirmed (thus indicating that the code is authentic and unmodified), the virtualization layer 310 may apply a protection profile 830 to the agent code that protects all of the code pages 710 of the agent 360 against modification by, e.g., rendering the pages execute-only. As a result, an attacker in the guest operating system is unable to write to those code pages, even though the guest page tables 410 may grant the pages write permission or the attacker may elevate the permissions to grant such write permission in the guest operating system. In other words, the nested page tables 430 would still enforce the protection profile that renders the pages write-protected, thus obviating the ability of the attacker to modify the agent code. Note that even if an attacker made a copy of the agent, e.g., prior to confirming the agent, that copy would include the same code with the same hash value and exhibit the same expected behavior, so the identity of the agent can be equally confirmed.

In another embodiment, the protection profile may be used to render a guest process (e.g., the agent process) visible when active, but invisible when inactive. Illustratively, in response to detecting a context switch to the agent process, the virtualization layer 310 marks the nested page table 430 to render the agent code pages readable and certain agent data structures writeable. Moreover, in response to detecting a context switch away from the agent, the nested page table 430 may be marked to render all of the agent code pages completely invisible, i.e., remove read, write and execute permissions in the NPT for those code pages. Thus, when inactive on a processor core, the agent's code pages appear "unplugged" from a main memory perspective, i.e., the pages seem to be not resident in memory 220. When the guest operating system switches back to the agent, the code pages may be made to reappear by again altering permissions (now allowing access) for those code pages in the NPT. Note that permissions for the code pages in the GPT, which is subject to attack in the guest mode, need not be altered other than pages used to translate access to the code pages themselves (i.e., pages storing portions of the GPT translating addresses of the code pages).

It should be noted that the agent 360 is an example of a unique guest process running in the guest operating system that cooperates with and is controlled by the virtualization layer 310. The unique guest process may be protected by altering the permissions of its pages (i.e., in the NPT) at the virtualization layer (micro-hypervisor) level between the time when the process is swapped into memory for execution (e.g., the pages are marked writeable and executable) and when the process is swapped out of memory (e.g., the pages are marked read-only or even rendered invisible by preventing all access) in order to protect the guest process against nefarious behavior in the guest operating system. Also the type of protection specified (and applied) by the protection profile 830 may vary depending on a desired level of security. That is, to protect the integrity of the unique guest process, it would be sufficient to render the pages write protected, which may allow an attacker to read the content of the pages. However, to also protect the confidentiality of the guest process, the pages would be rendered invisible to protect against reading of their content by the attacker.

Yet, the guest process protection technique described herein may be extended to apply the protection profile 830 to an arbitrary guest process 240 executing in the guest operating system. For example, the virtualization layer 310 may apply a protection profile to such a guest process wherein its code pages 710 are always render non-writable. Thus, if an attacker wants to modify code and the pages are not writable, the attacker cannot alter the code. In addition, the guest operating system may load a guest process into memory, at which point its memory pages 660 may be writeable. Once loaded into the memory pages, the virtualization layer 310 may employ the nested page table 430 to render the code pages 710 executable but without write permission, i.e., the pages are executable but the code in those pages are not alterable. Assume now that an attacker wants to modify the code of the guest process. Since the code is protected against writes, the attacker cannot modify the code because any writes attempted to those code pages 710 will result in a (NPT) page fault. Assume further that the attacker has guest mode kernel privileges in the guest operating system and, as such, adds write permission to the guest page table 410 for the code pages 710 of that guest process 240 to thereby allow the attacker to write to those code pages. Even in this scenario, the virtualization layer 310 may override the write permission in the GPT for those pages using the layered permissions in the nested page table 430. In another scenario, assume the attacker adds new code or data pages (as opposed to modifying existing permissions to the guest page table for the code pages). In this other scenario, the virtualization layer may detect additions to the GPT and again override any write permission in the GPT for those pages using the layered permissions in the nested page table. As such, the guest process protection technique may protect against: (i) pages being removed, (ii) pages being added; (iii) page permissions being modified; and (iv) translations (i.e., GPT address translations) being modified. Note that the technique may also be extended to protect equally guest operating system data structures in guest-physical memory.

In an embodiment, the protection profile 830 may apply to a guest process that is performance critical, wherein interception of any events for that process is not allowed. Accordingly, when the guest operating system kernel 230 switches to that guest process, the protection profile may specify that the virtualization layer 310 disable all intercepts and not apply any additional protection. Such a protection profile 830 may be part of a platform policy that extends from the appliance $200_M$ to the endpoint $200_E$, similar to virus signatures that define policy which specifies actions for specific processes. Note that the policy (and protection profile) could change at run-time. For example, if many false positives are generated for a particular guest process 240 because the protection profile is sub-optimal, that protection profile could be updated (refined) and the updated profile distributed to all endpoints $200_E$ to reduce the occurrence of false positives. Distribution of protection profiles may be further extended to updated policies defined for particular guest processes 240 that may be attacked by, e.g., a newly discovered exploit. The policy updates pushed to the endpoints $200_E$ may specify that, for a particular application created as a guest process at the endpoints, a particular memory location targeted by the new exploit should be protected and, in response to a write request to that location, a specified action should be performed.

The guest process protection technique described herein generally requires precision in the protection profiles 830 applied to memory pages 660 because over-protection of a guest process 240 in the guest operating system may cause a plurality of traps to the virtualization layer 310, many of which may be false positives. For example, if a data page (rather than a code page) of a guest process is write-protected, then any legitimate writing of data in the process will trap to the virtualization layer, forcing the micro-hypervisor 320 to determine whether the access is allowable (a legitimate write) or not (a malicious write). However, such determinations are generally not performed efficiently. It is thus desirable to distinguish between data pages and code pages, and protect only the code pages 710 against writing (because writing to the data pages may be legitimate). Yet, the guest process protection technique is sufficiently flexible to render data pages write-protected for a particular guest process 240 and not for another, thus allowing the virtualization layer 310 on a per-process basis to sort data page writes and determine which of them are legitimate and which are malicious.

In order to make the protection of a guest process effective and complete, it may not be sufficient to just protect certain memory pages 660 via the CPU 210 (i.e., MMU 215) against modification by an attacker; other hardware may independently access and modify the memory (e.g., device 270 via I/O transactions to main memory 220). In an embodiment, upon making one or more memory pages write-protected at the nested page tables 430 of the MMU 215, the virtualization layer 310 may also render the pages write-protected at the IOMMU 255 so that an attacker is also unable to write to the page via a direct memory access (DMA) transaction. In general, the IOMMU 255 only allows read and write permissions for a device 270; thus the attacker cannot execute code from the device, although it can read and write a page in main memory 220. Assume the nested page table 430 is modified to mark a code page 710 with read and execute permissions (i.e., but not write permission), such that the attacker can execute the code page on the CPU 210, but cannot write to the code page 710 from the CPU. However, the attacker could configure the device 270 (or a system DMA controller) to issue a DMA transaction to write to the page 710 from the device 270 whose control it may have co-opted. Marking the code page 710 read-only in the IOMMU 255 would close such an attack avenue. Similarly, the page 710 may be marked non-readable in the IOMMU 255 to protect the page against reads for confidentiality purposes, i.e., to prevent the attacker from reading that page via a DMA transaction.

Advantageously, the guest process protection technique provides protection at the granularity of code pages (or sub-pages) for a guest process running in a guest operating system. To that end, the virtualization layer (including the micro-hypervisor) may monitor the switching of the guest page table hierarchy in the guest operating system kernel to determine when the guest process executes and then may identify the guest process through hashing of its code pages. The virtualization layer may thereafter utilize the nested page table hierarchy to apply protections for the process at the granularity of code pages (or sub-pages), as opposed to protecting a general address space of the entire guest operating system kernel. In other words, the technique enables identification of a particular process and application of a protection profile to that process alone.

While there have been shown and described illustrative embodiments for protecting a guest process of a guest operating system using a virtualization layer executing on a node of a network environment, it is to be understood that various other adaptations and modifications may be made within the spirit and scope of the embodiments herein. For example, embodiments have been shown and described herein with relation to deployment of the virtualization architecture 300 in endpoint 200$_E$ of network 130. However, the embodiments in their broader sense are not so limited, and may, in fact, provide for deployment of the virtualization architecture 300 in an appliance, such as MDS appliance 200$_M$, of the network. In such a deployment, the virtualization layer 310 of the architecture may include the micro-hypervisor 320 and hyper-processes 350 described herein. However, instead of one or more micro-VMs, the virtualization architecture may employ one or more full VMs, wherein each VM may run a guest operating system (kernel and guest processes) associated with a guest monitor 352 and thread protection component 354. The use of a separate guest monitor 352 per VM isolates any error in the virtualization functionality that could be exploited by malware (triggered by an attacker) running in the VM to only the protection domain of the guest monitor, thereby preventing spread of the malware and obviating any performance impact on the other VMs. In addition, use of a separate threat protection component 354 for each VM facilitates use of different guest operating systems having different structures and organizations.

Moreover, the embodiments described herein may extend the guest process protection technique to allow protection of certain kernel data structures. For example, assume the virtualization layer is aware of the location of a run queue data structure of the guest operating system. The virtualization layer may write-protect that data structure to observe when changes occur to the run queue, such as writes that add a process or delete a process. However, there may again be a need to distinguish between legitimate and malicious writes. Furthermore, the virtualization layer 310 may protect a memory page containing the PCB 235 for a guest process 240 to observe an attempt to elevate privileges by modifying, e.g., user credentials. By protecting the page, the virtualization layer can observe accesses to the page and emulate any legitimate (permitted) accesses.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
    a memory configured to store a guest process, a guest operating system kernel and a virtualization layer;
    a memory management unit (MMU) coupled to and separate from the memory, the MMU including a guest page table hierarchy associated with the guest process; and
    a central processing unit (CPU) coupled to the MMU and adapted to execute the guest process, the guest operating system kernel and the virtualization layer, the CPU including a control register represented by a virtual control register within the virtualization layer, the virtualization layer, when executed, being operable to:
        determine that the guest operating system kernel is switching from a prior guest process to the guest process for execution on the CPU when an address for the guest page table hierarchy associated with the guest process is loaded into the virtual control register;
        determine an identity of the guest process associated with the guest page table hierarchy using at least one of an agent of the guest operating system, guest operating system specific knowledge, or content analysis of the guest process; and
        apply a protection profile associated with the identified guest process to override permissions of one or more memory pages of the guest process as defined by the guest page table hierarchy.

2. The system of claim 1 wherein the guest process runs in an address space of guest-virtual addresses and has one or more guest page tables of the guest page table hierarchy associated with the address space.

3. The system of claim 2 wherein, during a context switch when the guest operating system kernel switches from the prior guest process to the guest process, the guest operating system kernel changes a prior guest page table hierarchy associated with the prior guest process to the guest page table hierarchy of the guest process by loading the address of the guest page table hierarchy into the virtual control register.

4. The system of claim 1 wherein each of the prior guest process and the guest process runs in a separate guest address space and one or more guest page tables form the guest page table hierarchy.

5. The system of claim 1 wherein the virtualization layer when executed is further operable to communicate with the agent of the guest operating system to acquire the identity of the guest process from a guest operating system data structure.

6. The system of claim 1 wherein the virtualization layer when executed is further operable to use the guest operating system specific knowledge to parse a guest operating system data structure to reveal a field having a path that includes a name for the guest process and to deduce the identity of the guest process from the process name.

7. The system of claim 1 wherein the virtualization layer when executed is further operable to perform the content analysis of the guest process by hashing one or more code pages of the guest process marked by the guest page table hierarchy to identify the guest process.

8. The system of claim 1 wherein the guest page table hierarchy is controlled by the guest operating system kernel to translate a guest-virtual address to a guest-physical address.

9. The system of claim 8 wherein the MMU includes a nested page table hierarchy that is controlled by the virtualization layer to translate the guest-physical address to a host-physical address used to access the memory.

10. The system of claim 9 wherein the virtualization layer when executed is further operable to override the permissions of the one or more memory pages of the guest process as defined by the guest page table hierarchy using the guest-physical address to host-physical address translation performed at the nested page table hierarchy on a per process basis.

11. The system of claim 1 wherein the protection profile contains information about process events to be intercepted and specifies restrictions to be applied when the guest process is active.

12. The system of claim 11 wherein the protection profile applies different restrictions for different instances of the guest process.

13. The system of claim 11 wherein the protection profile applies similar restrictions for a plurality of instances of the guest process.

14. The system of claim 1 wherein the virtualization layer including a user mode portion including one or more hyper-processes and a kernel portion including at least a micro-hypervisor that cooperate to virtualize the guest operating system kernel within the virtual machine and to make hardware resources of the system available for use by the guest operating system kernel.

15. The system of claim 1, wherein the agent of the guest operating system is a protected component within the guest operating system communicatively coupled to a kernel portion of the virtualization layer over an interface.

16. The method of claim 15 wherein the interface is a privileged interface embodied as a set of defined hyper-calls, each of the hyper-calls to communicate with a micro-hypervisor deployed within the kernel portion of the virtualization layer.

17. A method comprising:
storing one or more guest page tables of a guest page table hierarchy and one or more nested page tables of a nested page table hierarchy;
storing an address for the guest page hierarchy in a virtual control register being part of a virtualization layer and corresponding to a control register of a central processing unit (CPU) of a node, the CPU being adapted to execute a guest process, a guest operating system kernel and the virtualization layer resident in a memory of the node;
determining that the guest operating system kernel switches from a prior guest process to the guest process for execution on the CPU when the address for the guest page table hierarchy associated with the guest process is loaded into the virtual control register;
determining an identity of the guest process associated with the guest page table hierarchy at the virtualization layer using at least one of an agent of the guest operating system, guest operating system specific knowledge, or content analysis or the guest process; and
applying a protection profile associated with the identified guest process at the virtualization layer to override permissions of one or more code pages of the guest process as defined by the guest page table hierarchy.

18. The method of claim 17, wherein the determining that the guest operating system kernel switches from the prior guest process associated with the prior guest page table hierarchy to the guest process associated with the guest page table hierarchy includes intercepting a write access from the guest operating system kernel to the virtual control register.

19. The method of claim 17 wherein using the agent of the guest operating system to determine the identity of the guest process associated with the guest page table hierarchy at the virtualization layer comprises communicating with the agent to acquire the identity of the guest process from a guest operating system data structure when the guest process is created.

20. The method of claim 17 wherein wherein using the guest operating system specific knowledge to determine the identity of the guest process associated with the guest page table hierarchy at the virtualization layer comprises parsing a guest operating system data structure to reveal a field having a path that includes a name for the guest process and deducing the identity of the guest process from the process name.

21. The method of claim 17 wherein using the content analysis of the guest process to determine the identity of the guest process associated with the guest page table hierarchy at the virtualization layer comprises hashing the code pages of the guest process marker by the guest page table hierarchy to identify the guest process.

22. The method of claim 14 wherein the determining of the identity of the guest process associated with the guest page table hierarchy at the virtualization layer is conducted using one of an agent of the guest operating system, guest operating system specific knowledge, and content analysis of the guest process.

23. The method of claim 17 wherein the virtualization layer including a user mode portion including one or more hyper-processes and a kernel portion including at least a micro-hypervisor that cooperate to virtualize the guest operating system kernel within the virtual machine and to make hardware resources of the system available for use by the guest operating system kernel.

24. The method of claim 17, wherein the agent of the guest operating system is a protected component within the guest operating system communicatively coupled to a kernel portion of the virtualization layer over an interface.

25. The method of claim 24, wherein the interface is a privileged interface embodied as a set of defined hyper-calls, each of the hyper-calls to communicate with a micro-hypervisor deployed within the kernel portion of the virtualization layer.

26. A non-transitory computer readable media containing instructions for execution on a central processing unit (CPU) of a node that performs operations comprising:
storing one or more guest page tables of a guest page table hierarchy and one or more nested page tables of a nested page table hierarchy;
storing an address for the guest page table hierarchy in a virtual control register associated with the CPU, the CPU being adapted to execute a guest process, a guest operating system kernel and a virtualization layer resident in a memory of the node;
determining that the guest operating system kernel switches from a prior guest process to the guest process for execution on the CPU when the address for the guest page table hierarchy associated with the guest process is loaded into the virtual control register;
determining an identity of the guest process associated with the guest page table hierarchy at the virtualization layer using at least one of an agent of the guest operating system, guest operating system specific knowledge, or content analysis of the guest process; and
applying a protection profile associated with the identified guest process at the virtualization layer to override permissions of one or more memory pages of the guest process as defined by the guest page table hierarchy.

27. The non-transitory computer readable media of claim 26 wherein the virtualization layer includes a user mode portion including one or more hyper-processes and a kernel portion including at least a micro-hypervisor that cooperate to virtualize the guest operating system kernel within the virtual machine and to make hardware resources of the node available for use by the guest operating system.

28. The non-transitory computer readable media of claim 26 wherein the using of the agent of the guest operating system to determine the identity of the guest process associated with the guest page table hierarchy at the virtualization layer comprises communication with the agent to acquire the identity of the guest process from a guest operating system data structure when the guest process is created.

29. The non-transitory computer readable media of claim 26 wherein the using of the guest operating system specific knowledge to determine the identity of the guest process associated with the guest page table hierarchy at the virtualization layer comprises parsing a guest operating system data structure to reveal a field having a path that includes a name for the guest process and deducing the identity of the guest process from the process name.

30. The non-transitory computer readable media of claim 26 wherein the using of the content analysis of the guest process to determine the identity of the guest process associated with the guest page table hierarchy at the virtualization layer comprises hashing the code pages of the guest process marked by the guest page table hierarchy to identify the guest process.

31. The non-transitory computer readable media of claim 26 wherein the applying of the protection profile associated with the identified guest process at the virtualization layer comprises overriding the permissions of the one or more code pages using a guest-physical address to host-physical address translation performed at the nest page table hierarchy.

32. The non-transitory computer readable media of claim 26, wherein the instructions for execution performs the operation of determining that the guest operating system kernel switches from the prior guest process to the guest process comprises intercepting a write access from the guest operating system kernel to the virtual control register.

* * * * *